US012795688B2

(12) United States Patent
Hu et al.

(10) Patent No.: US 12,795,688 B2
(45) Date of Patent: Nov. 10, 2026

(54) METHOD AND DEVICE FOR PUCCH POWER CONTROL

(71) Applicant: Apogee 5G Global, LLC, Plano, TX (US)

(72) Inventors: Yang Hu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 208 days.

(21) Appl. No.: 18/512,070

(22) Filed: Nov. 17, 2023

(65) Prior Publication Data

US 2024/0089990 A1 Mar. 14, 2024

Related U.S. Application Data

(63) Continuation of application No. PCT/CN2022/093187, filed on May 17, 2022.

(30) Foreign Application Priority Data

May 21, 2021 (CN) ........................ 202110556436.9

(51) Int. Cl.
*H04W 72/232* (2023.01)
*H04L 1/1812* (2023.01)
(Continued)

(52) U.S. Cl.
CPC ......... *H04W 72/232* (2023.01); *H04L 1/1812* (2013.01); *H04W 72/0473* (2013.01); *H04W 72/1273* (2013.01)

(58) Field of Classification Search
CPC ........... H04W 72/232; H04W 72/0473; H04W 72/1273; H04W 52/48; H04W 52/50;
(Continued)

(56) References Cited

U.S. PATENT DOCUMENTS

| | | | | |
|---|---|---|---|---|
| 8,830,883 | B2 | 9/2014 | Chen et al. | |
| 9,467,984 | B2 | 10/2016 | Seo et al. | |
| 10,333,671 | B2 | 6/2019 | Seo et al. | |
| 2012/0113831 | A1 | 5/2012 | Pelletier et al. | |
| 2015/0146588 | A1 * | 5/2015 | Park ...................... | H04L 1/1854 370/280 |

(Continued)

FOREIGN PATENT DOCUMENTS

| | | | |
|---|---|---|---|
| CN | 103493419 | A | 1/2014 |
| CN | 106993332 | A | 7/2017 |

(Continued)

OTHER PUBLICATIONS

Vivo, "Remaining issues on HARQ operation for NR-U", 3GPP TSG RAN WG1#101, R1-2003372 (Year: 2020).*

(Continued)

*Primary Examiner* — Ayaz R Sheikh
*Assistant Examiner* — Mang Boi Thawng
(74) *Attorney, Agent, or Firm* — Volpe Koenig

(57) ABSTRACT

A first receiver receives a first information block and a first signaling, the first information block is used to determine a first time-frequency resource pool, the first signaling comprises a first field, the first signaling is used to schedule K PDSCHs, K being a positive integer greater than 1 and not greater than N, N being pre-defined or configurable; a first transmitter adopts first transmit power to transmit a first signal, herein, a first resource amount is a number of resource element(s) used for the first signal comprised in the first time-frequency resource pool; at least one of K or N is used to determine a first value, and the first field and the first value are used together to determine a first number of information bit(s); the first number of information bit(s) and the first resource amount are used together to determine the first transmit power.

15 Claims, 8 Drawing Sheets

(51) Int. Cl.
*H04W 72/044* (2023.01)
*H04W 72/1273* (2023.01)

(58) Field of Classification Search
CPC . H04W 52/146; H04W 52/325; H04W 52/18; H04W 72/0446; H04W 72/0453; H04L 1/1812; H04L 1/1861; H04L 1/1896; H04L 5/0055; H04L 5/0053
See application file for complete search history.

(56) References Cited

U.S. PATENT DOCUMENTS

| | | | | |
|---|---|---|---|---|
| 2015/0319776 | A1 | 11/2015 | Seo et al. | |
| 2018/0160413 | A1* | 6/2018 | Papasakellariou | H04L 1/0045 |
| 2019/0313342 | A1 | 10/2019 | Aris | |
| 2020/0127772 | A1* | 4/2020 | Papasakellariou | H04W 72/20 |
| 2021/0007096 | A1 | 1/2021 | Huang | |
| 2021/0099975 | A1 | 4/2021 | Wu | |
| 2021/0152292 | A1* | 5/2021 | Fu | H04W 52/48 |
| 2021/0258997 | A1* | 8/2021 | Khoshnevisan | H04L 1/1854 |
| 2022/0039029 | A1* | 2/2022 | Zhang | H04W 52/281 |
| 2024/0188084 | A1* | 6/2024 | Choi | H04L 1/1671 |
| 2025/0016770 | A1* | 1/2025 | Kim | H04L 1/1822 |
| 2025/0106851 | A1* | 3/2025 | Zhang | H04L 1/1614 |

FOREIGN PATENT DOCUMENTS

| | | | |
|---|---|---|---|
| CN | 109474371 | A | 3/2019 |
| CN | 112564865 | A | 3/2021 |
| CN | 112769532 | A | 5/2021 |
| WO | 2011041623 | A1 | 4/2011 |
| WO | 2012060649 | A2 | 5/2012 |
| WO | 2020091348 | A1 | 5/2020 |
| WO | 2020091492 | A1 | 5/2020 |
| WO | 2021093512 | A1 | 5/2021 |

OTHER PUBLICATIONS

Samsung :"CR to 38.213 capturing theRAN1#94bis and RAN1#95 meetingagreements"3GPP Draft;38213 CR0007R2(REL-15)R1-1814394 DRAFTCR 38.213 After RAN#95 , 3rdeerpartnership Project(3GPP).

Supplementary European Search Report received in application EP22803938.4, dated Sep. 5, 2024.

Third Generation Partnership Project, "Technical Specification Group Radio Access Network; NR; Multiplexing and channel coding (Release 16)," 3GPP TS 38.212 V16.5.0 (Mar. 2021).

Third Generation Partnership Project, "Technical Specification Group Radio Access Network; NR; Physical layer procedures for control (Release 16)," 3GPP TS 38.213 V16.5.0 (Mar. 2021).

Third Generation Partnership Project, "Technical Specification Group Radio Access Network; NR; Physical layer procedures for data (Release 16)," 3GPP TS 38.214 V16.5.0 (Mar. 2021).

Third Generation Partnership Project, "Technical Specification Group Radio Access Network; NR; Radio Resource Control (RRC) protocol specification (Release 16)," 3GPP TS 38.331 V16.4.1 (Mar. 2021).

Samsung "Corrections on Ultra Reliable Low Latency Communications Enhancements"3GPP TSG-RAN WG1 Meeting #101-e R1-2005140 Jun. 24, 2020.

ISR received in application No. PCT/CN2022/093187 dated Aug. 17, 2022.

First Office Action of Chinese patent application No. CN202110556436.9 dated Jun. 2, 2023.

First Search Report of Chinese patent application No. CN202110556436.9 dated May 30, 2023.

Notification to Grant Patent Right for Invention of Chinese patent application No. CN202110556436.9 dated Jul. 7, 2023.

Ericsson, Draft New WID on NR enhancements for UAV, 3GPP TSG RAN Meeting #86, RP-192451, Sitges, Spain (Dec. 9-12, 2019).

He et al., Implications of Incident Power Density Limits on Power and EIRP Levels of 5G Millimeter-Wave User Equipment, IEEE Access (Sep. 2020).

Le et al., An Overview of Physical Layer Desin for Ultra-Reliable Low-Latency Communciations in 3GPP Releases 15,16, and 17, IEEE Access (Dec. 2020.

Udoh et al., Analytical Modeling of Radio Network Performance for 5G (Non-Standalone) and It's Network Connectivity, Journal of Communications, vol. 15, No. 12 (Dec. 2020).

* cited by examiner

First transmit power = min{upper transmit power, target transmit power}
The target transmit power = First one of power control components + ⋯ + target adjustment component + ⋯ + P-th power control component
FIG. 13
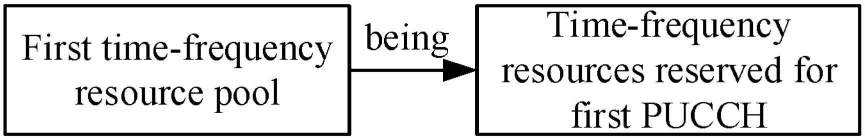
FIG. 14
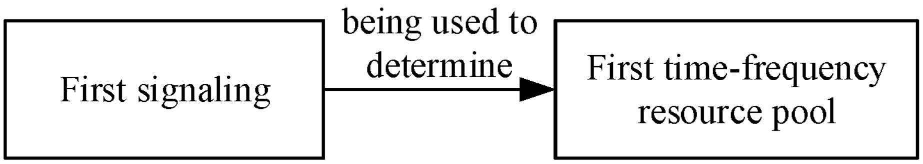
FIG. 15
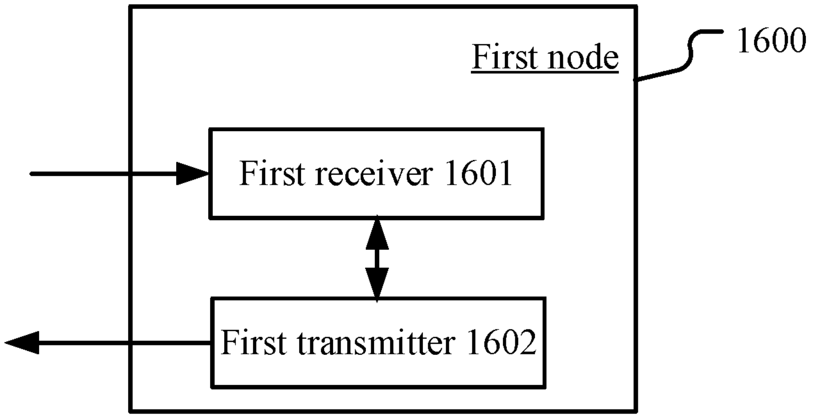
FIG. 16

METHOD AND DEVICE FOR PUCCH POWER CONTROL

CROSS REFERENCE TO RELATED APPLICATIONS

This application is the continuation of the international patent application No. PCT/CN2022/093187, filed on May 17, 2022, and claims the priority benefit of Chinese Patent Application No. 202110556436.9, filed on May 21, 2021, the full disclosure of which is incorporated herein by reference.

BACKGROUND

Technical Field

The present application relates to transmission methods and devices in wireless communication systems, and in particular to a transmission method and device of a radio signal in wireless communication systems supporting cellular networks.

Related Art

For wireless communications using high-frequency frequency bands (such as frequency bands between 52.6 GHz and 71 GHz), 3GPP supports a scheduling method of one Downlink Control Information (DCI) signaling scheduling multiple Physical Downlink Shared CHannel (PDSCH) receptions in NR Release 17 version.

SUMMARY

After introducing the function of one DCI scheduling multiple PDSCH receptions, how to reasonably adjust the determination method of PUCCH transmit power to adapt to the new Downlink Assignment Index (DAI) interpretation is a key problem that must be solved.

To address the above problem, the present application provides a solution. It should be noted that though the present application only took the Uplink for example in the statement above, it is also applicable to other transmission scenarios, such as Downlink and Sidelink, where similar technical effects can be achieved. Additionally, the adoption of a unified solution for various scenarios (including but not limited to Uplink, Downlink and Sidelink) contributes to the reduction of hardcore complexity and costs. It should be noted that the embodiments in a User Equipment (UE) in the present application and characteristics of the embodiments may be applied to a base station if no conflict is incurred, and vice versa. And the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

receiving a first information block and a first signaling, the first information block being used to determine a first time-frequency resource pool, the first signaling comprising a first field, the first signaling being used to schedule K PDSCHs, K being a positive integer greater than 1 and not greater than N, N being pre-defined or configurable; and adopting first transmit power to transmit a first signal, the first signal carrying at least one control information bit, control information bit(s) carried by the first signal comprising HARQ-ACK information bit(s) for the K PDSCHs;

herein, time-frequency resources occupied by the first signal belong to the first time-frequency resource pool; a first resource amount is a number of resource element (s) used for the first signal comprised in the first time-frequency resource pool; at least one of K or N is used to determine a first value, and the first field and the first value are used together to determine a first number of information bit(s); the first number of information bit(s) and the first resource amount are used together to determine the first transmit power.

In one embodiment, a problem to be solved in the present application comprises: how to determine transmit power of an uplink physical channel.

In one embodiment, a problem to be solved in the present application comprises: how to determine transmit power of a PUCCH.

In one embodiment, a problem to be solved in the present application comprises: how to determine transmit power of a PUCCH used to transmit a Type-2 HARQ-ACK codebook after introducing the function of one DCI scheduling multiple PDSCH receptions.

In one embodiment, characteristics of the above method comprise: determining transmit power of a PUCCH based on the interpretation of a DAI field after introducing the function of a DCI scheduling multiple PDSCH receptions.

In one embodiment, characteristics of the above method comprise: a number of PDSCH(s) scheduled by the first signaling is used to determine the first transmit power.

In one embodiment, characteristics of the above method comprise: a maximum number of PDSCH(s) that can be scheduled by one DCI is used to determine the first transmit power.

In one embodiment, advantages of the above method comprise: being conducive to achieving power control of a PUCCH transmitted in a high-frequency frequency band.

In one embodiment, advantages of the above method comprise: being conducive to reducing interference generated by uplink transmission.

In one embodiment, advantages of the above method comprise: being conducive to reducing power overhead.

In one embodiment, advantages of the above method comprise: avoiding incorrect power control of a PUCCH incurred by the new interpretation method of a DAI field.

In one embodiment, advantages of the above method comprise: only minor modifications are required under the framework of the original power control method, resulting in good compatibility.

According to one aspect of the present application, the above method is characterized in that a number of control information bit(s) carried by the first signal is greater than 2 and not greater than 11.

According to one aspect of the present application, the above method is characterized in that the first value is equal to a maximum value in a first value set, the first value set comprises a first intermediate value, the first intermediate value is equal to N multiplied by a first parameter value, and the first parameter value is equal to 1 or 2.

According to one aspect of the present application, the above method is characterized in that the first field is used to determine a second value, and a product of the first value and the second value is used to determine the first number of information bit(s).

In one embodiment, characteristics of the above method comprise: for a DCI scheduling K PDSCHs, the comprised counter DAI field only counts once for all K PDSCHs.

According to one aspect of the present application, the above method is characterized in that the first value is equal to a sum of J numbers; for any positive integer j not greater than the J, a j-th number among the J numbers is equal to: a total number of DCI(s) used to indicate an SPS PDSCH release or an SCell dormancy for serving cell c_j detected in a first time-domain resource pool, as well as a total number of PDSCH(s) scheduled by DCI(s) for the serving cell c_j detected in the first time-domain resource pool; the first signaling is a DCI for serving cell c_i detected in the first time-domain resource pool, K is counted in an i-th number among the J number(s), i being a positive integer not greater than J.

In one embodiment, characteristics of the above method comprise: a value determined by a sum of a total number of one type of DCIs and a total number of PDSCHs scheduled by another type of DCIs is used to determine the first transmit power.

In one embodiment, characteristics of the above method comprise: a number of DCIs and a number of PDSCHs (PPDSCH receptions) are jointly counted to determine the first transmit power.

In one embodiment, characteristics of the above method comprise: different from the processing method of the existing protocol (3GPP NR Release 16 version), which only counts a number of DCIs, a result of the joint counting of a number of DCIs and a number of PDSCHs (or PDSCH receptions) is used to determine the first transmit power.

In one embodiment, characteristics of the above method comprise: for a DCI scheduling K PDSCHs, the comprised counter DAI field respectively counts for the K PDSCHs and count K times in total.

According to one aspect of the present application, the above method is characterized in that a second value is equal to a difference value of a value of the first field minus the first value then modulo $T_D$, $T_D$ being a positive integer, the first number of information bit(s) is equal to a sum of multiple addends, and a product of the second value multiplied by a first parameter value is one of the multiple addends.

According to one aspect of the present application, the above method is characterized in that a first calculation amount is equal to a sum of the first number of information bit(s) plus a second number of information bit(s), and the first calculation amount and the first resource amount are used together to determine a first adjustment amount; at least one of a number of SR information bit(s) comprised in control information bit(s) carried by the first signal or a number of CSI information bit(s) comprised in control information bit(s) carried by the first signal is used to determine the second number of information bit(s).

According to one aspect of the present application, the above method is characterized in that a target adjustment amount is equal to the first adjustment amount, the first transmit power is equal to a smaller one of upper transmit power and target transmit power, the target adjustment amount is used to determine the target transmit power, and the upper transmit power is pre-defined or configurable.

The present application provides a method in a second node for wireless communications, comprising:

transmitting a first information block and a first signaling, the first information block being used to determine a first time-frequency resource pool, the first signaling comprising a first field, the first signaling being used to schedule K PDSCHs, K being a positive integer greater than 1 and not greater than N, N being pre-defined or configurable; and receiving a first signal transmitted with first transmit power, the first signal carrying at least one control information bit, control information bit(s) carried by the first signal comprising HARQ-ACK information bit(s) for the K PDSCHs;

herein, time-frequency resources occupied by the first signal belong to the first time-frequency resource pool; a first resource amount is a number of resource element(s) used for the first signal comprised in the first time-frequency resource pool; at least one of K or N is used to determine a first value, and the first field and the first value are used together to determine a first number of information bit(s); the first number of information bit(s) and the first resource amount are used together to determine the first transmit power.

According to one aspect of the present application, the above method is characterized in that a number of control information bit(s) carried by the first signal is greater than 2 and not greater than 11.

According to one aspect of the present application, the above method is characterized in that the first value is equal to a maximum value in a first value set, the first value set comprises a first intermediate value, the first intermediate value is equal to N multiplied by a first parameter value, and the first parameter value is equal to 1 or 2.

According to one aspect of the present application, the above method is characterized in that the first field is used to determine a second value, and a product of the first value and the second value is used to determine the first number of information bit(s).

According to one aspect of the present application, the above method is characterized in that the first value is equal to a sum of J numbers; for any positive integer j not greater than the J, a j-th number among the J numbers is equal to: a total number of DCI(s) used to indicate an SPS PDSCH release or an SCell dormancy for serving cell c_j detected in a first time-domain resource pool, as well as a total number of PDSCH(s) scheduled by DCI(s) for the serving cell c_j detected in the first time-domain resource pool; the first signaling is a DCI for serving cell c_i detected in the first time-domain resource pool, K is counted in an i-th number among the J number(s), i being a positive integer not greater than J.

According to one aspect of the present application, the above method is characterized in that a second value is equal to a difference value of a value of the first field minus the first value then modulo $T_D$, $T_D$ being a positive integer, the first number of information bit(s) is equal to a sum of multiple addends, and a product of the second value multiplied by a first parameter value is one of the multiple addends.

According to one aspect of the present application, the above method is characterized in that a first calculation amount is equal to a sum of the first number of information bit(s) plus a second number of information bit(s), and the first calculation amount and the first resource amount are used together to determine a first adjustment amount; at least one of a number of SR information bit(s) comprised in control information bit(s) carried by the first signal or a number of CSI information bit(s) comprised in control information bit(s) carried by the first signal is used to determine the second number of information bit(s).

According to one aspect of the present application, the above method is characterized in that a target adjustment amount is equal to the first adjustment amount, the first transmit power is equal to a smaller one of upper transmit power and target transmit power, the target adjustment amount is used to determine the target transmit power, and the upper transmit power is pre-defined or configurable.

The present application provides a first node for wireless communications, comprising:

a first receiver, receiving a first information block and a first signaling, the first information block being used to determine a first time-frequency resource pool, the first signaling comprising a first field, the first signaling being used to schedule K PDSCHs, K being a positive integer greater than 1 and not greater than N, N being pre-defined or configurable; and a first transmitter, adopting first transmit power to transmit a first signal, the first signal carrying at least one control information bit, control information bit(s) carried by the first signal comprising HARQ-ACK information bit(s) for the K PDSCHs;

herein, time-frequency resources occupied by the first signal belong to the first time-frequency resource pool; a first resource amount is a number of resource element (s) used for the first signal comprised in the first time-frequency resource pool; at least one of K or N is used to determine a first value, and the first field and the first value are used together to determine a first number of information bit(s); the first number of information bit(s) and the first resource amount are used together to determine the first transmit power.

The present application provides a second node for wireless communications, comprising:

a second transmitter, transmitting a first information block and a first signaling, the first information block being used to determine a first time-frequency resource pool, the first signaling comprising a first field, the first signaling being used to schedule K PDSCHs, K being a positive integer greater than 1 and not greater than N, N being pre-defined or configurable; and a second receiver, receiving a first signal transmitted with first transmit power, the first signal carrying at least one control information bit, control information bit(s) carried by the first signal comprising HARQ-ACK information bit(s) for the K PDSCHs;

herein, time-frequency resources occupied by the first signal belong to the first time-frequency resource pool; a first resource amount is a number of resource element (s) used for the first signal comprised in the first time-frequency resource pool; at least one of K or N is used to determine a first value, and the first field and the first value are used together to determine a first number of information bit(s); the first number of information bit(s) and the first resource amount are used together to determine the first transmit power.

In one embodiment, the method in the present application is advantageous in the following aspects:

being conducive to implementing power control of a PUCCH transmitted in the high-frequency frequency band;

being conducive to reducing interference generated by uplink transmission;

being conducive to reducing power overhead;

avoiding incorrect power control of a PUCCH incurred by the new interpretation method of a DAI field;

having good compatibility.

BRIEF DESCRIPTION OF THE DRAWINGS

Other features, objects and advantages of the present application will become more apparent from the detailed description of non-restrictive embodiments taken in conjunction with the following drawings:

FIG. 13 illustrates a schematic diagram of a target adjustment amount being used to determine first transmit power according to one embodiment of the present application;

FIG. 14 illustrates a schematic diagram of a first time-frequency resource pool according to one embodiment of the present application;

FIG. 15 illustrates a schematic diagram of a relation between a first signaling and a first time-frequency resource pool according to one embodiment of the present application;

FIG. 16 illustrates a structure block diagram of a processor in a first node according to one embodiment of the present application;

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
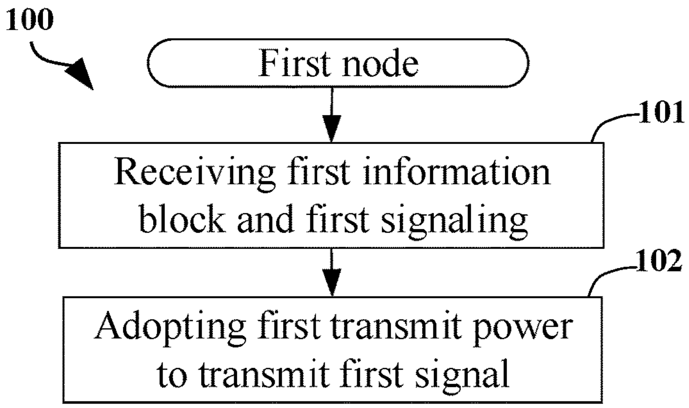
FIG. 1 illustrates a flowchart of the processing of a first node according to one embodiment of the present application.

Embodiment 1 illustrates a flowchart of processing of a first node according to one embodiment of the present application, as shown in FIG. 1.

In Embodiment 1, the first node in the present application receives a first information block and a first signaling in step 101; adopts first transmit power to transmit a first signal in step 102.

In embodiment 1, the first information block is used to determine a first time-frequency resource pool, the first signaling comprises a first field, the first signaling is used to schedule K PDSCHs, K being a positive integer greater than 1 and not greater than N, N being pre-defined or configurable; the first signal carries at least one control information bit, control information bit(s) carried by the first signal comprises(comprise) HARQ-ACK information bit(s) for the K PDSCHs; time-frequency resources occupied by the first signal belong to the first time-frequency resource pool; a first resource amount is a number of resource element(s) used for the first signal comprised in the first time-frequency resource pool; at least one of K or N is used to determine a first value, and the first field and the first value are used together to determine a first number of information bit(s); the first number of information bit(s) and the first resource amount are used together to determine the first transmit power.

In one embodiment, the first signal in the present application comprises a radio signal.

In one embodiment, the first signal in the present application comprises a radio frequency signal.

In one embodiment, the first signal in the present application comprises a baseband signal.

In one embodiment, the meaning of the expression of the first signal carrying at least one control information bit comprises: the first signal comprises an output after all or partial bits in the at least one control information bit are sequentially through part or all of CRC Insertion, Segmentation, Code Block-level CRC Insertion, Channel Coding, Rate Matching, Concatenation, Scrambling, Modulation, Layer Mapping, Precoding, Mapping to Resource Element, Multicarrier symbol Generation and Modulation and Upconversion.

In one embodiment, the meaning of the expression of the first signal carrying at least one control information bit comprises: the first signal comprises an output after all or partial bits in the at least one control information bit are sequentially through part or all of Channel Coding, Rate Matching, Concatenation, Scrambling, Modulation, Layer Mapping, Precoding, Mapping to Resource Element, Multicarrier symbol Generation and Modulation and Upconversion.

In one embodiment, control information bit(s) carried by the first signal does(do) not comprise information bit(s) for a Part 2 CSI report.

In one embodiment, the first time-frequency resource pool in the present application comprises at least one Resource Element (RE) in time-frequency domain.

In one embodiment, the RE occupies a multicarrier symbol in time domain, and a subcarrier in frequency domain.

In one embodiment, the multicarrier symbol in the present application is an Orthogonal Frequency Division Multiplexing (OFDM) symbol.

In one embodiment, the multicarrier symbol in the present application is a Single Carrier-Frequency Division Multiple Access (SC-FDMA) symbol.

In one embodiment, the multicarrier symbol in the present application is a Discrete Fourier Transform Spread OFDM (DFT-S-OFDM) symbol.

In one embodiment, the multicarrier symbol in the present application is a Filter Bank Multicarrier (FBMC) symbol.

In one embodiment, the multicarrier symbol in the present application comprises a Cyclic Prefix (CP).

In one embodiment, the first time-frequency resource pool in the present application comprises a positive integer number of subcarrier(s) in frequency domain.

In one embodiment, the first time-frequency resource pool in the present application comprises a positive integer number of Physical Resource Block(s) (PRB(s)) in frequency domain.

In one embodiment, the first time-frequency resource pool in the present application comprises a positive integer number of Resource Block(s) (RB(s)) in frequency domain.

In one embodiment, the first time-frequency resource pool in the present application comprises a positive integer number of multicarrier symbol(s) in time domain.

In one embodiment, the first time-frequency resource pool in the present application comprises a positive integer number of slot(s) in time domain.

In one embodiment, the first time-frequency resource pool in the present application comprises a positive integer number of sub-slot(s) in time domain.

In one embodiment, the first time-frequency resource pool in the present application comprises a positive integer number of ms(s) in time domain.

In one embodiment, the first time-frequency resource pool in the present application comprises a positive integer number of continuous multicarrier symbol(s) in time domain.

In one embodiment, the first time-frequency resource pool in the present application comprises a positive integer number of discontinuous slot(s) in time domain.

In one embodiment, the first time-frequency resource pool in the present application comprises a positive integer number of continuous slot(s) in time domain.

In one embodiment, the first time-frequency resource pool in the present application comprises a positive integer number of sub-frame(s) in time domain.

In one embodiment, the first time-frequency resource pool in the present application is indicated by a physical-layer signaling or configured by a higher-layer signaling.

In one embodiment, the first time-frequency resource pool in the present application is indicated by DCI, or configured by a Radio Resource Control (RRC) signaling or configured by a Medium Access Control layer Control Element (MAC CE) signaling.

In one embodiment, the first time-frequency resource pool in the present application comprises time-frequency resources occupied by an uplink physical channel.

In one embodiment, the uplink physical channel in the present application is a Physical Uplink Control CHannel (PUCCH) or a Physical Uplink Shared CHannel (PUSCH).

In one embodiment, the first time-frequency resource pool in the present application is all or part of time-frequency resources occupied by a PUCCH resource.

In one embodiment, the first time-frequency resource pool comprises time-frequency resources reserved for a physical channel, and the physical channel is used to transmit the first signal.

In one embodiment, the first time-frequency resource pool comprises time-frequency resources reserved for a physical control channel, and the physical control channel is used to transmit the first signal.

In one embodiment, the first time-frequency resource pool comprises time-frequency resources reserved for a physical shared channel, and the physical shared channel is used to transmit the first signal.

In one embodiment, the first information block comprises an RRC signaling.

In one embodiment, the first information block comprises an IE.

In one embodiment, the first information block is an IE.

In one embodiment, the first information block comprises one or multiple fields in an IE.

In one embodiment, the first information block comprises a MAC CE signaling.

In one embodiment, the first information block comprises one or multiple fields in a DCI.

In one embodiment, the first information block comprises a higher-layer signaling.

In one embodiment, the first information block is PUCCH-config.

In one embodiment, the first information block is PUCCH-configurationList.

In one embodiment, the first information block is BWP-dedicated.

In one embodiment, the first information block is sps-PUCCH-AN.

In one embodiment, the first information block is sps-PUCCH-AN-ResourceID.

In one embodiment, a name of the first information block comprises PUCCH.

In one embodiment, a name of the first information block comprises PUCCH-config.

In one embodiment, the first signaling is dynamically configured.

In one embodiment, the first signaling comprises a layer 1 (L1) signaling.

In one embodiment, the first signaling comprises a L1 control signaling.

In one embodiment, the first signaling comprises a physical-layer signaling.

In one embodiment, the first signaling comprises one or multiple fields in a physical-layer signaling.

In one embodiment, the first signaling comprises a higher-layer signaling.

In one embodiment, the first signaling comprises one or multiple fields in a higher-layer signaling.

In one embodiment, the first signaling comprises a Radio Resource Control (RRC) signaling.

In one embodiment, the first signaling comprises a Medium Access Control layer Control Element (MAC CE) signaling.

In one embodiment, the first signaling comprises one or multiple fields in an RRC signaling.

In one embodiment, the first signaling comprises one or multiple fields in a MAC CE signaling.

In one embodiment, the first signaling comprises Downlink Control Information (DCI).

In one embodiment, the first signaling comprises one or multiple fields in a DCI.

In one embodiment, the first signaling is a DCI.

In one embodiment, the first signaling comprises Sidelink Control Information (SCI).

In one embodiment, the first signaling comprises one or multiple fields in an SCI.

In one embodiment, the first signaling comprises one or multiple fields in an Information Element (IE).

In one embodiment, the first signaling is a DownLink Grant Signalling.

In one embodiment, the first signaling is an UpLink Grant Signalling.

In one embodiment, the first signaling is transmitted on a downlink physical-layer control channel (i.e., a downlink channel only capable of carrying a physical-layer signaling).

In one embodiment, the downlink physical-layer control channel in the present application is a Physical Downlink Control CHannel (PDCCH).

In one subembodiment of the above embodiment, the downlink physical-layer control channel in the present application is a short PDCCH (sPDCCH).

In one embodiment, the downlink physical-layer control channel in the present application is a Narrow Band PDCCH (NB-PDCCH).

In one embodiment, the first signaling is DCI format 1_0, and for the specific meaning of the DCI format 1_0, refer to section 7.3.1.2 in 3GPP TS38.212.

In one embodiment, the first signaling is DCI format 1_1, and for the specific meaning of the DCI format 1_1, refer to section 7.3.1.2 in 3GPP TS38.212.

In one embodiment, the first signaling is DCI format 1_2, and for the specific meaning of the DCI format 1_2, refer to section 7.3.1.2 in 3GPP TS38.212.

In one embodiment, the first information block indicates the first time-frequency resource pool.

In one embodiment, the first information block explicitly indicates the first time-frequency resource pool.

In one embodiment, the first information block implicitly indicates the first time-frequency resource pool.

In one embodiment, the first time-frequency resource pool is all or part in time-frequency resources occupied by a physical channel indicated/configured by the first information block.

In one embodiment, the first time-frequency resource pool is all or part of resources occupied by a PUCCH resource configured in the first information block in time-frequency domain.

In one embodiment, the first time-frequency resource pool is resources occupied by one of multiple PUCCH resources configured in the first information block in time-frequency domain.

In one embodiment, the first time-frequency resource pool is resources occupied by a PUCCH resource indicated by the first information block in time-frequency domain.

In one embodiment, the first time-frequency resource pool is resources occupied by a Physical Sidelink Control Channel (PSCCH) indicated by the first information block in time-frequency domain.

In one embodiment, the first signal is a signal transmitted on a PUCCH.

In one embodiment, the first signal is a PUCCH.

In one embodiment, the first signal comprises a signal in one or more frequency-hopping intervals in multiple frequency-hopping intervals for a PUCCH transmission.

In one embodiment, the first signal does not carry a Cyclic Redundancy Check (CRC) bit.

In one embodiment, the control information bit in the present application is an Uplink Control Information (UCI) bit.

In one embodiment, the control information bit in the present application is a Hybrid Automatic Repeat reQuest ACKnowledgement (HARQ_ACK) information bit.

In one embodiment, a HARQ_ACK information bit indicates ACK or NACK.

In one embodiment, the control information bit in the present application is a HARQ_ACK information bit or a Scheduling Request (SR) information bit.

In one embodiment, the control information bit in the present application is a HARQ_ACK information bit or an SR information bit or a Channel State Information (CSI) information bit.

In one embodiment, the control information bit in the present application is bit carrying control information of a higher-layer signaling.

In one embodiment, the control information bit in the present application is a Sidelink Control Information (SCI) bit.

In one embodiment, the control information bit in the present application is: a HARQ-ACK information bit, or an SR information bit, or a CSI information bit, or a bit acquired after at least one of the three types of information bits is through at least one of logical AND, logical OR, logical NOT, and XOR operations.

In one embodiment, a number of control information bit(s) carried by the first signal is not greater than 1706.

In one embodiment, a number of control information bit(s) carried by the first signal is greater than 2.

In one embodiment, a number of control information bit(s) carried by the first signal is not greater than 11.

In one embodiment, a number of control information bit(s) carried by the first signal is not greater than 22.

In one embodiment, the resource elements used for the first signal comprised in the first time-frequency resource pool comprises: resource elements (REs) used to map the first signal in the first time-frequency resource pool.

In one embodiment, the resource elements used for the first signal comprised in the first time-frequency resource pool comprises: resource elements used to map a modulation symbol carried by the first signal in the first time-frequency resource pool.

In one embodiment, the resource elements used for the first signal comprised in the first time-frequency resource pool comprises: resource elements used to map a modulation symbol generated by a control information bit carried by the first signal in the first time-frequency resource pool.

In one embodiment, the first signal is a part other than a DeModulation Reference Signal (DM-RS) transmission of a signal transmitted in a PUCCH.

In one embodiment, a number of RE(s) occupied by the first signal in time-frequency domain is equal to: $M_{RB}$ multiplied by $N_{sc}$ multiplied by $N_{symbol}$; the $M_{RB}$ is equal to a number of RB(s) comprised by all or part of the first time-frequency resource pool in frequency domain, the $N_{sc}$ is equal to a number of subcarrier(s) other than a subcarrier used for DM-RS transmission in each RB, and the $N_{symbol}$ is equal to a number of multicarrier symbol(s) other than a multicarrier symbol used for DM-RS transmission in time domain in the first time-frequency resource pool.

In one embodiment, the first resource amount is equal to: $M_{RB}$ multiplied by $N_{sc}$ multiplied by $N_{symbol}$; the $M_{RB}$ is equal to a number of RB(s) comprised by all or part of the first time-frequency resource pool in frequency domain, the $N_{sc}$ is equal to a number of subcarrier(s) other than a subcarrier used for DM-RS transmission in each RB, and the $N_{symbol}$ is equal to a number of multicarrier symbol(s) other than a multicarrier symbol used for DM-RS transmission in time domain in the first time-frequency resource pool.

In one embodiment, the first signaling is a DCI format.

In one embodiment, the first signaling is a DCI for serving cell c_i, c_i being a non-negative integer.

In one embodiment, the K PDSCHs scheduled by the first signaling are on a service cell c_i, c_i being a non-negative integer.

In one embodiment, the first signaling is received on serving cell c_i, c_i being a non-negative integer.

In one embodiment, the first signaling is not received on serving cell c_i, c_i being a non-negative integer.

In one embodiment, in the present application, one or multiple PDSCHs scheduled by the first signaling or a DCI refers to: one or multiple PDSCHs scheduled by the first signaling or the DCI.

In one embodiment, the first signaling is a last DCI detected by the first node in a first time-domain resource pool.

In one embodiment, the first signaling is a last DCI used to schedule multiple PDSCHs detected by the first node in a first time-domain resource pool.

In one embodiment, the first signaling is a last DCI detected by the first node in a last PDCCH monitoring occasion in a first time-domain resource pool.

In one embodiment, the first signaling is a DCI comprising a total DAI field detected by the first node in a last PDCCH monitoring occasion in a first time-domain resource pool.

In one embodiment, the first field is a DAI field comprised in the first signaling.

In one embodiment, the first field is a counter DAI field comprised in the first signaling.

In one embodiment, the first field is a total DAI field comprised in the first signaling.

In one embodiment, the first field is a field configured for a DCI format of the first signaling.

In one embodiment, the first field comprises at least one bit.

In one embodiment, the first signaling indicates the K PDSCHs.

In one embodiment, the first signaling indicating scheduling information of the K PDSCHs, and the scheduling information comprises: at least one of occupied time-domain resources, occupied frequency-domain resources, a Modulation and Coding Scheme (MCS), configuration information of DeModulation Reference Signals (DMRS), a Hybrid Automatic Repeat request (HARQ) process number, a Redundancy Version (RV), a New Data Indicator (NDI), a transmission antenna port, or a corresponding Transmission Configuration Indicator (TCI) state.

In one embodiment, the configuration in the present application comprises an explicit configuration.

In one embodiment, the configuration in the present application comprises an implicit configuration.

In one embodiment, N is configured for a serving cell.

In one embodiment, N is configured for a Bandwidth Part (BWP) of a serving cell.

In one embodiment, N is configured for the serving cell c_i in the present application.

In one embodiment, N is configured for an activated downlink BWP of the serving cell c_i in the present application.

In one embodiment, N is used to limit a maximum number of PDSCHs that can be scheduled by one DCI.

In one embodiment, N is related to a maximum number of PDSCH(s) that can be scheduled by one DCI.

In one embodiment, N is equal to: a maximum number of PDSCH(s) that can be scheduled by one DCI(s) configured for a serving cell.

In one embodiment, N is equal to: a maximum number of PDSCH(s) that can be scheduled by one DCI for the serving cell c_i in the present application.

In one embodiment, N is equal to: time-domain resources that can be occupied belong to a maximum number of PDSCH(s) scheduled by one DCI for the serving cell c_i in the present application in the first time-domain resource pool in the present application.

In one embodiment, N is: a maximum number of PDSCH (s) that can be scheduled by one DCI on the serving cell c_i in the present application.

In one embodiment, N is: a maximum number of PDSCH (s) that can be scheduled by one DCI on an activated downlink BWP of the serving cell c_i in the present application.

In one embodiment, N is equal to a maximum number of PDSCH(s) that can be scheduled by one DCI on a downlink BWP of a serving cell.

In one embodiment, N is determined based on available PDSCH time-domain resource allocation.

In one embodiment, N is not greater than 4.

In one embodiment, N is not greater than 8.

In one embodiment, N is predefined.

In one embodiment, the first number of information bit(s) is not greater than a number of HARQ-ACK information bit(s) carried by the first signal.

In one embodiment, the first node is configured with only a former of a PDSCH reception based on transport block (TB) and a PDSCH reception based on a Code Block Group (CBG).

In one embodiment, the first node is not configured with a CBG-based PDSCH reception.

In one embodiment, the first node is not configured with PDSCH CodeBlockGroupTransmission on any serving cell.

In one embodiment, control information bit(s) carried by the first signal comprises(comprise) a UCI.

In one embodiment, control information bit(s) carried by the first signal comprises(comprise) at least one bit.

In one embodiment, control information bit(s) carried by the first signal comprises(comprise) at least a HARQ-ACK information bit in a HARQ-ACK information bit, an SR information bit, and a CSI information bit.

In one embodiment, a HARQ-ACK information bit for a PDSCH is used to indicate whether the PDSCH is correctly received.

In one embodiment, the serving cell in the present application can be counted once or multiple times.

In one embodiment, the first resource amount is a number of resource element(s) used to carry the first signal comprised in the first time-frequency resource pool.

In one embodiment, the first resource amount comprises a positive integer number of RE(s).

In one embodiment, the first value is equal to a maximum value in a first value set, and N is used to determine a value in the first value set.

In one embodiment, the first value is equal to a maximum value in a first value set, and a value in the first value set is linearly correlated with N.

In one embodiment, one of the DCI in the present application is a DCI format.

In one embodiment, any one of the DCI in the present application is one of a DCI format 1_0, a DCI format 1_1 and a DCI format 1_2.

In one embodiment, any one of the DCI in the present application is one of a DCI format 1_1 and a DCI format 1_2.

In one embodiment, any one of the DCI in the present application is one of a DCI format 1_0 and a DCI format 1_2.

In one embodiment, any one of the DCI in the present application is one of a DCI format 1_0 and a DCI format 1_1.

In one embodiment, any one of the DCI in the present application is a DCI format 1_0.

In one embodiment, any one of the DCI in the present application is a DCI format 1_1.

In one embodiment, any one of the DCI in the present application is a DCI format 1_2.

In one embodiment, the first signaling is a DCI format 1_0.

In one embodiment, the first signaling is a DCI format 1_1.

In one embodiment, the first signaling is a DCI format 1_2.

In one embodiment, the first number of information bit(s) is linearly correlated with the first value.

In one embodiment, a value of the first field is a non-negative integer.

In one embodiment, a value of the first field is a positive integer.

In one embodiment, a value of the first field is one of 1, 2, 3, 4.

In one embodiment, a value of the first field is one of 1 to 8.

In one embodiment, a value of the first field is one of 1 to 16.

In one embodiment, a value of the first field is one of 1 to 32.

In one embodiment, a value of the first field is one of 1 to 64.

In one embodiment, a value of the first field is an integer not greater than 2048.

In one embodiment, when time-domain resources indicated by a time-domain resource assignment field of a DCI in a slot comprise an uplink multicarrier symbol, there is no PDSCH scheduled by the one of DCI in the slot.

In one embodiment, a Time domain resource assignment field of a DCI indicates T1 time domain resource pool(s), T1 being a positive integer; T2 time-domain resource pool(s) in the T1 time-domain resource pool(s) does(do) not comprise any uplink multicarrier symbol, and any time-domain resource pool other than the T2 time-domain resource pool (s) in the T1 time domain resource pool(s) comprises at least one uplink multicarrier symbol; the one of DCI is considered to schedule T2 PDSCH(s); T2 is not greater than the T1, the T1 time-domain resource pool(s) does(do) not overlap with each other in time domain, and the T2 time-domain resource pool(s) comprises (respectively comprise) time-domain resources reserved for the T2 PDSCH(s).

In one subembodiment of the above embodiment, the T1 time-domain resource pool(s) corresponds (respectively correspond) to T1 SLIV(s).

In one embodiment, a Time domain resource assignment field of a DCI indicates T1 time domain resource pool(s), and the one of DCI is considered to schedule T1 PDSCH(s), T1 being a positive integer.

In one subembodiment of the above embodiment, the T1 time-domain resource pool(s) corresponds (respectively correspond) to T1 SLIV(s).

Embodiment 2

Figure 2:
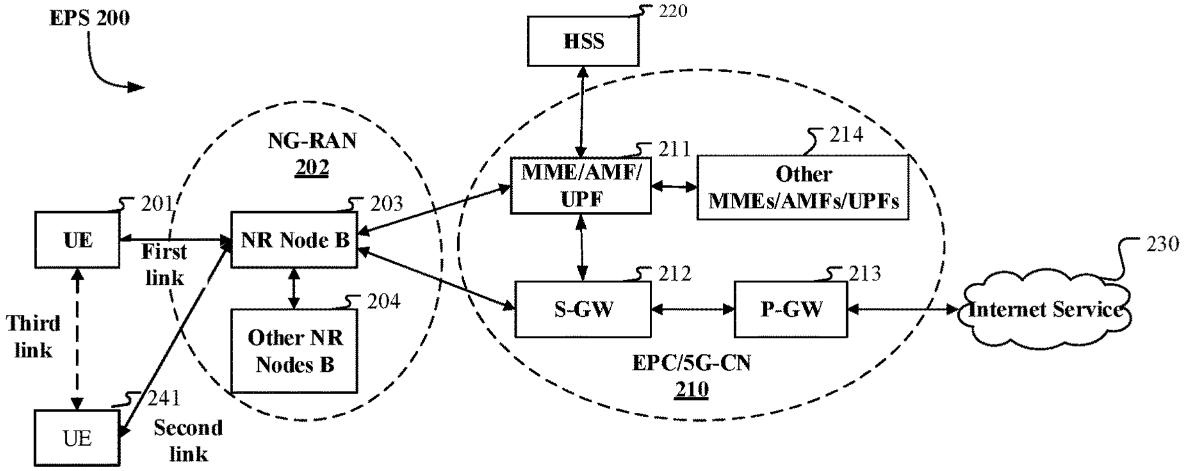
FIG. 2 illustrates a schematic diagram of a network architecture according to one embodiment of the present application.

Embodiment 2 illustrates a schematic diagram of a network architecture according to the present application, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 241 corresponds to the second node in the present application.

In one embodiment, the gNB 203 corresponds to the first node in the present application.

In one embodiment, the gNB 203 corresponds to the second node in the present application.

In one embodiment, the UE 241 corresponds to the first node in the present application.

In one embodiment, the UE 201 corresponds to the second node in the present application.

Embodiment 3

Figure 3:
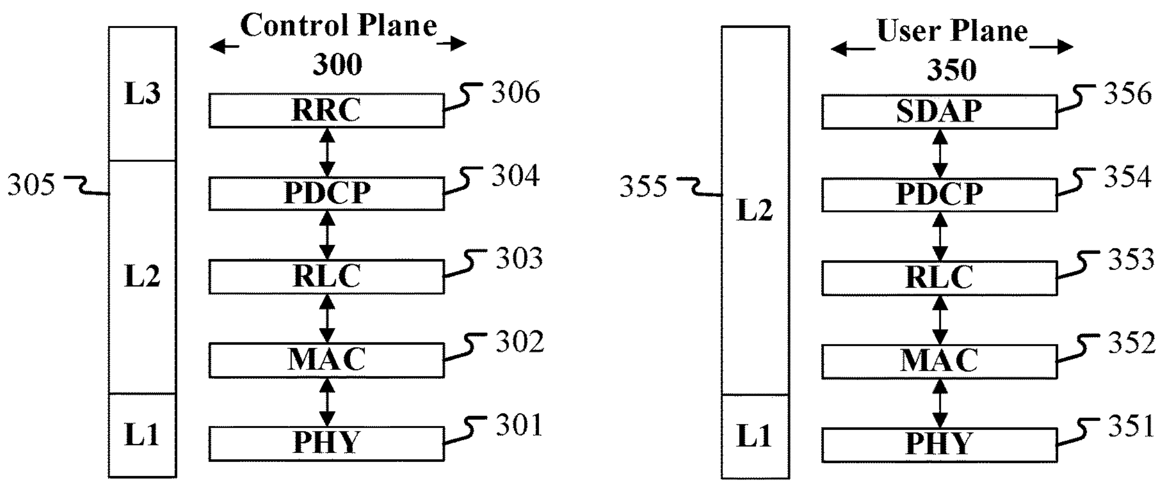
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., RB) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first information block in the present application is generated by the RRC sublayer 306.

In one embodiment, the first information block in the present application is generated by the MAC sublayer 302.

In one embodiment, the first information block in the present application is generated by the MAC sublayer 352.

In one embodiment, the first signaling in the present application is generated by the RRC sublayer 306.

In one embodiment, the first signaling in the present application is generated by the MAC sublayer 302.

In one embodiment, the first signaling in the present application is generated by the MAC sublayer 352.

In one embodiment, the first signaling in the present application is generated by the PHY 301.

In one embodiment, the first signaling in the present application is generated by the PHY 351.

In one embodiment, the control information in the present application is generated by the RRC sublayer 306.

In one embodiment, the control information in the present application is generated by the SDAP sublayer 356.

In one embodiment, the control information in the present application is generated by the MAC sublayer 302.

In one embodiment, the control information in the present application is generated by the MAC sublayer 352.

In one embodiment, the control information in the present application is generated by the PHY 301.

In one embodiment, the control information in the present application is generated by the PHY 351.

In one embodiment, the first signal in the present application is generated by the PHY 301.

In one embodiment, the first signal in the present application is generated by the PHY 351.

Embodiment 4

Figure 4:
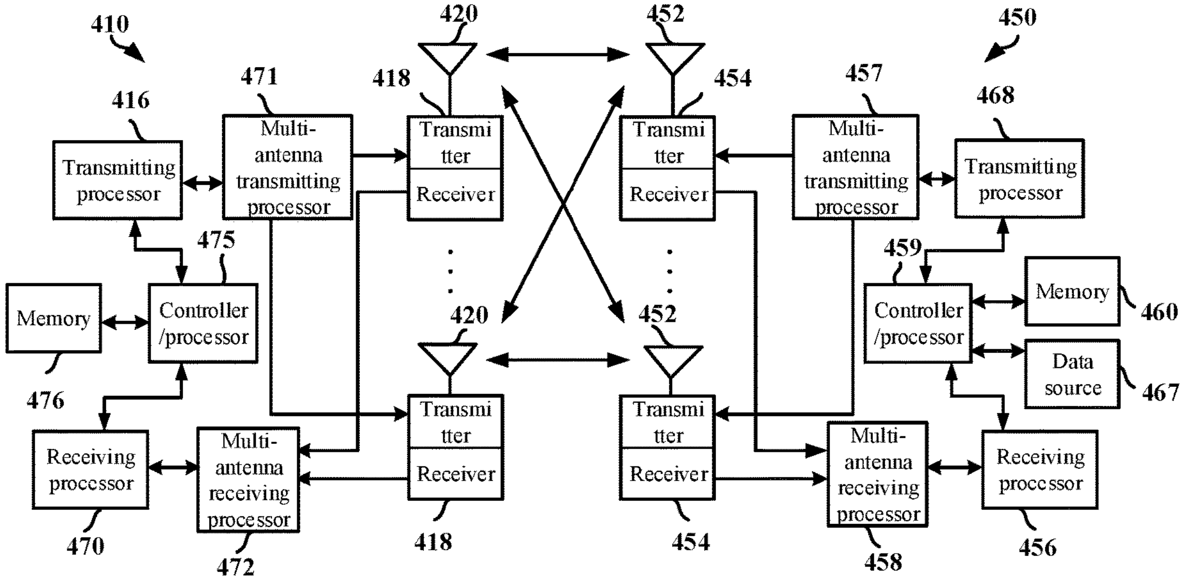
FIG. 4 illustrates a schematic diagram of a first communication device and a second communication device according to one embodiment of the present application.

Embodiment 4 illustrates a schematic diagram of a first communication device and a second communication device in the present application, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present application comprises the second communication device 450, and the second node in the present application comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is a base station.

In one subembodiment of the above embodiment, the first node is a relay node, and the second node is a base station.

In one subembodiment of the above embodiment, the second node is a UE, and the first node is a base station.

In one subembodiment of the above embodiment, the second node is a relay node, and the first node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first information block in the present application and the first signaling in the present application, the first information block is used to determine the first time-frequency resource pool in the present application, the first signaling comprises the first field in the present application, the first signaling is used to schedule K PDSCHs, K being a positive integer greater than 1 and not greater than N, N being pre-defined or configurable; adopts the first transmit power in the present application to transmit the first signal in the present application, the first signal carries at least one control information bit, control information bit(s) carried by the first signal comprises(comprise) HARQ-ACK information bit(s) for the K PDSCHs; herein, time-frequency resources occupied by the first signal belong to the first time-frequency resource pool; a first resource amount is a number of resource element(s) used for the first signal comprised in the first time-frequency resource pool; at least one of K or N is used to determine a first value, and the first field and the first value are used together to determine a first number of information bit(s); the first number of information bit(s) and the first resource amount are used together to determine the first transmit power.

In one subembodiment of the above embodiment, the second communication device 450 corresponds to the first node in the present application.

In one embodiment, the second communication device 450 comprises a memory that stores a computer readable instruction program. The computer readable instruction program generates an action when executed by at least one processor. The action includes: receiving the first information block in the present application and the first signaling in the present application, the first information block being used to determine the first time-frequency resource pool in the present application, the first signaling comprising the first field in the present application, the first signaling being used to schedule K PDSCHs, K being a positive integer greater than 1 and not greater than N, N being pre-defined or configurable; adopting the first transmit power in the present application to transmit the first signal in the present application, the first signal carrying at least one control information bit, control information bit(s) carried by the first signal comprising HARQ-ACK information bit(s) for the K PDSCHs; herein, time-frequency resources occupied by the first signal belong to the first time-frequency resource pool; a first resource amount is a number of resource element(s) used for the first signal comprised in the first time-frequency resource pool; at least one of K or N is used to determine a first value, and the first field and the first value are used together to determine a first number of information bit(s); the first number of information bit(s) and the first resource amount are used together to determine the first transmit power.

In one subembodiment of the above embodiment, the second communication device 450 corresponds to the first node in the present application.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first information block in the present application and the first signaling in the present application, the first information block is used to determine the first time-frequency resource pool in the present application, the first signaling comprises the first field in the present application, the first signaling is used to schedule K PDSCHs, K being a positive integer greater than 1 and not greater than N, N being pre-defined or configurable; receives the first signal in the present application transmitted with the first transmit power in the present application, the first signal carries at least one control information bit, control information bit(s) carried by the first signal comprises(comprise) HARQ-ACK information bit(s) for the K PDSCHs; herein, time-frequency resources occupied by the first signal belong to the first time-frequency resource pool; a first resource amount is a number of resource element(s) used for the first signal comprised in the first time-frequency resource pool; at least one of K or N is used to determine a first value, and the first field and the first value are used together to determine a first number of information bit(s); the first number of information bit(s) and the first resource amount are used together to determine the first transmit power.

In one subembodiment of the above embodiment, the first communication device 410 corresponds to the second node in the present application.

In one embodiment, the first communication device 410 comprises a memory that stores a computer readable instruction program. The computer readable instruction program generates an action when executed by at least one processor. The action includes: transmitting the first information block in the present application and the first signaling in the present application, the first information block being used to determine the first time-frequency resource pool in the present application, the first signaling comprising the first field in the present application, the first signaling being used to schedule K PDSCHs, K being a positive integer greater than 1 and not greater than N, N being pre-defined or configurable; receiving the first signal in the present application transmitted with the first transmit power in the present application, the first signal carrying at least one control information bit, control information bit(s) carried by the first signal comprising HARQ-ACK information bit(s) for the K PDSCHs; herein, time-frequency resources occupied by the first signal belong to the first time-frequency resource pool; a first resource amount is a number of resource element(s) used for the first signal comprised in the first time-frequency resource pool; at least one of K or N is used to determine a first value, and the first field and the first value are used together to determine a first number of information bit(s); the first number of information bit(s) and the first resource amount are used together to determine the first transmit power.

In one subembodiment of the above embodiment, the first communication device 410 corresponds to the second node in the present application.

In one embodiment, at least one of the antenna 452, the receiver 454, the multi-antenna receiving processor 458, the receiving processor 456, the controller/processor 459, the memory 460 or the data source 467 is used to receive the first information block in the present application.

In one embodiment, at least one of the antenna 420, the transmitter 418, the multi-antenna transmitting processor 471, the transmitting processor 416, the controller/processor 475 or the memory 476 is used to transmit the first information block in the present application.

In one embodiment, at least one of the antenna 452, the receiver 454, the multi-antenna receiving processor 458, the receiving processor 456, the controller/processor 459, the memory 460, or the data source 467 is used to receive the first signaling in the present application.

In one embodiment, at least one of the antenna 420, the transmitter 418, the multi-antenna transmitting processor 471, the transmitting processor 416, the controller/processor 475, or the memory 476 is used to transmit the first signaling in the present application.

In one embodiment, at least one of the antenna 452, the transmitter 454, the multi-antenna transmitting processor 458, the transmitting processor 468, the controller/processor 459, the memory 460, or the data source 467 is used to transmit the first signal in the present application with the first transmit power in the present application.

In one embodiment, at least one of the antenna 420, the receiver 418, the multi-antenna receiving processor 472, the receiving processor 470, the controller/processor 475, or the memory 476 is used to receive the first signal in the present application.

Embodiment 5

Figure 5:
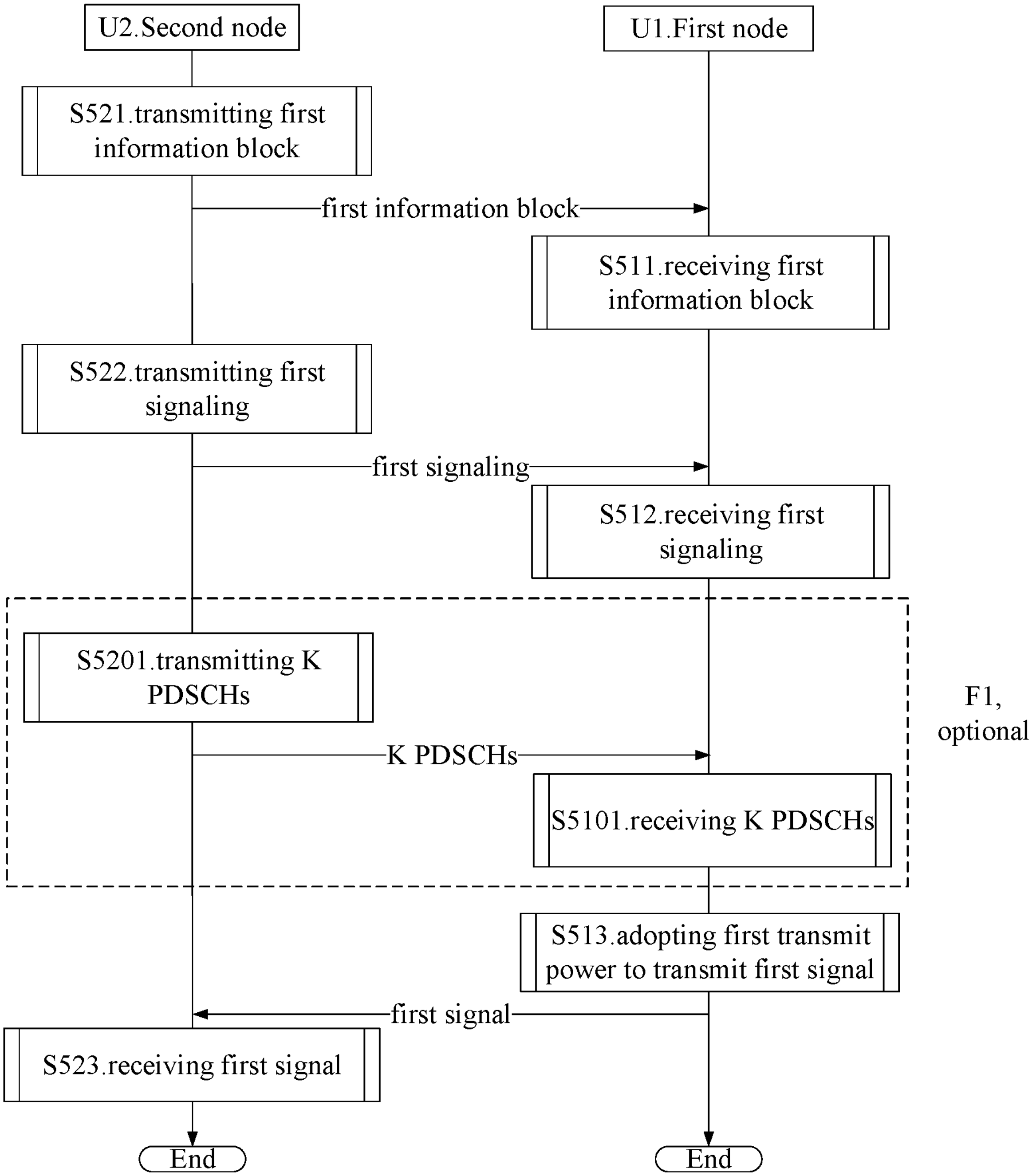
FIG. 5 illustrates a flowchart of signal transmission according to one embodiment of the present application.

Embodiment 5 illustrates a flowchart of signal transmission according to one embodiment in the present application, as shown in FIG. 5. In FIG. 5, a first node U1 and a second node U2 are in communications via an air interface. In FIG. 5, steps in the dotted box F1 are optional.

The first node U1 receives a first information block in step S511; receives a first signaling in step S512; receives K PDSCHs in step S5101; adopts first transmit power to transmit a first signal in step S513.

The second node U2 transmits a first information block in step S521; transmits a first signaling in step S522; transmits K PDSCHs in step S5201; and receives a first signal in step S523.

In embodiment 5, the first information block is used to determine a first time-frequency resource pool, the first signaling comprises a first field, the first signaling is used to schedule K PDSCHs, K being a positive integer greater than 1 and not greater than N, N being pre-defined or configurable; the first signal carries at least one control information bit, control information bit(s) carried by the first signal comprises(comprise) HARQ-ACK information bit(s) for the K PDSCHs; time-frequency resources occupied by the first signal belong to the first time-frequency resource pool; a first resource amount is a number of resource element(s) used for the first signal comprised in the first time-frequency resource pool; at least one of K or N is used to determine a first value, and the first field and the first value are used together to determine a first number of information bit(s); the first number of information bit(s) and the first resource amount are used together to determine the first transmit power; a number of control information bit(s) carried by the first signal is greater than 2 and not greater than 11.

In subembodiment in embodiment 5, the first value is equal to a maximum value in a first value set, the first value set comprises a first intermediate value, the first intermediate value is equal to N multiplied by a first parameter value, and the first parameter value is equal to 1 or 2; the first field is used to determine a second value, and a product of the first value and the second value is used to determine the first number of information bit(s).

In subembodiment in embodiment 5, the first value is equal to a sum of J numbers; for any positive integer j not greater than the J, a j-th number among the J numbers is equal to: a total number of DCI(s) used to indicate an SPS PDSCH release or an SCell dormancy for serving cell c_j detected in a first time-domain resource pool, as well as a total number of PDSCH(s) scheduled by DCI(s) for the serving cell c_j detected in the first time-domain resource pool; the first signaling is a DCI for serving cell c_i detected in the first time-domain resource pool, K is counted in an i-th number among the J number(s), i being a positive integer not greater than J; a second value is equal to a difference value of a value of a first field minus a first value modulo $T_D$, $T_D$ being a positive integer, a first number of information bit(s) is equal to a sum of multiple addends, and a product of the second value multiplied by a first parameter value is one of the multiple addends.

In one subembodiment of embodiment 5, a first calculation amount is equal to a sum of the first number of information bit(s) plus a second number of information bit(s), and the first calculation amount and the first resource amount are used together to determine a first adjustment amount; at least one of a number of SR information bit(s) comprised in control information bit(s) carried by the first signal or a number of CSI information bit(s) comprised in control information bit(s) carried by the first signal is used to determine the second number of information bit(s).

In one subembodiment of embodiment 5, a target adjustment amount is equal to the first adjustment amount, the first transmit power is equal to a smaller one of upper transmit power and target transmit power, the target adjustment amount is used to determine the target transmit power, and the upper transmit power is pre-defined or configurable.

In one embodiment, in the present application: each subembodiment of one embodiment can be arbitrarily combined with each other.

In one embodiment, the first node U2 is the first node in the present application.

In one embodiment, the second node U2 is the second node in the present application.

In one embodiment, the first node U1 is a UE.

In one embodiment, the first node U1 is a base station.

In one embodiment, the second node U2 is a base station.

In one embodiment, the second node U2 is a UE.

In one embodiment, an air interface between the second node U2 and the first node U1 is a Uu interface.

In one embodiment, an air interface between the second node U2 and the first node U1 comprises a cellular link.

In one embodiment, an air interface between the second node U2 and the first node U1 is a PC5 interface.

In one embodiment, an air interface between the second node U2 and the first node U1 comprises sidelink.

In one embodiment, an air interface between the second node U2 and the first node U1 comprises a radio interface between a base station and a UE.

In one embodiment, an air interface between the second node U2 and the first node U1 comprises a radio interface between a UE and a UE.

In one embodiment, the first value is equal to a sum of J numbers; for any positive integer j not greater than the J, a j-th number among the J numbers is equal to: a total number of DCI(s) used to indicate an SPS PDSCH release for serving cell c_j detected in a first time-domain resource pool, as well as a total number of PDSCH(s) scheduled by DCI(s) for the serving cell c_j detected in the first time-domain resource pool; the first signaling is a DCI for serving cell c_i detected in the first time-domain resource pool, K is counted in an i-th number among the J number(s), i being a positive integer not greater than J.

In one embodiment, the first value is equal to a sum of J numbers; for any positive integer j not greater than the J, a j-th number among the J numbers is equal to: a sum of a total number of PDSCHs scheduled by one DCI for serving cell c_j detected in a first time-domain resource pool; the first signaling is a DCI for serving cell c_i detected in the first time-domain resource pool, K is counted in an i-th number among the J number(s), i being a positive integer not greater than J.

In one embodiment, in the present application, when a DCI is used to indicate an SPS PDSCH release or an SCell dormancy, a serving cell that the one of DCI is for is a serving cell to which a PDCCH occupied by the one of DCI belongs.

In one embodiment, in the present application, when a DCI is used to schedule a PDSCH, a serving cell that the one of DCI is for is a serving cell to which the scheduled PDSCH belongs.

In one embodiment, the first value is equal to a sum of a total number of first-type DCIs detected in a first time-domain resource pool and a total number of PDSCHs scheduled by a second-type DCIs detected in the first time-domain resource pool; the first signaling is the second-type DCI, K is counted into the number of the PDSCH(s) scheduled by the second-type DCI; the first-type DCI is different from the second-type DCI.

In one embodiment, the first-type DCI in the present application and the second-type DCI in the present application are respectively used to carry different types of indication information.

In one embodiment, the first-type DCI in the present application and the second-type DCI in the present application are respectively used to indicate different UE behaviors.

In one embodiment, the first-type DCI in the present application comprises a DCI used to indicate an SPS PDSCH release or an SCell dormancy, and the second-type DCI in the present application comprises a DCI used to schedule a PDSCH.

In one embodiment, the first-type DCI in the present application is a DCI used to indicate an SPS PDSCH release or an SCell dormancy, and the second-type DCI in the present application is a DCI used to schedule a PDSCH.

In one embodiment, the first-type DCI or the second-type DCI is specific to a serving cell.

In one embodiment, a difference value between a value of the first field and the first value is used to determine the first number of information bit(s).

In one embodiment, the first value is linearly correlated with the K.

In one embodiment, a first value is linearly correlated with the N.

In one embodiment, a first calculation amount is equal to the first number of information bit(s); the first calculation amount and the first resource amount are used together to determine the first adjustment amount.

In one embodiment, all control information bits carried by the first signal are control information bits of a same priority.

In one embodiment, all control information bits carried by the first signal are control information bits corresponding to a same priority index.

In one embodiment, at least two control information bits carried by the first signal respectively correspond to different priority indices.

In one embodiment, a target adjustment amount is equal to the first adjustment amount; the first transmit power is equal to a maximum value of multiple candidate transmit power, one of the multiple candidate transmit power is equal to a minimum value between upper transmit power and target transmit power, the target adjustment amount is used to determine the target transmit power, and the upper transmit power is pre-defined or configurable; the multiple candidate transmit power is obtained by the first node executing a calculation.

In one embodiment, a target adjustment amount is equal to the first adjustment amount; the first transmit power is equal to a minimum value of multiple candidate transmit power, one of the multiple candidate transmit power is equal to a minimum value between upper transmit power and target transmit power, the target adjustment amount is used to determine the target transmit power, and the upper transmit power is pre-defined or configurable; the multiple candidate transmit power is obtained by the first node executing a calculation.

In one embodiment, a target adjustment amount is equal to a maximum value among multiple candidate adjustment amounts, and the first adjustment amount is one of the multiple candidate adjustment amounts; the first transmit power is equal to a smaller one of upper transmit power and target transmit power, the target adjustment amount is used to determine the target transmit power, and the upper transmit power is pre-defined or configurable; the multiple candidate adjustments is obtained by the first node executing a calculation.

In one embodiment, a target adjustment amount is equal to a minimum value among multiple candidate adjustment amounts, and the first adjustment amount is one of the multiple candidate adjustment amounts; the first transmit power is equal to a smaller one of upper transmit power and target transmit power, the target adjustment amount is used to determine the target transmit power, and the upper transmit power is pre-defined or configurable; the multiple candidate adjustments is obtained by the first node executing a calculation.

In one embodiment, a PDSCH in the present application is used to transmit at least one TB.

In one embodiment, in the present application, a DCI being received/detected refers to: a DCI being received/detected by the first node in the present application.

In one embodiment, in the present application, a received PDSCH or a TB refers to: a PDSCH or a TB received by the first node in the present application.

In one embodiment, a subcarrier spacing of the first time-frequency resource pool in frequency domain is configurable.

In one embodiment, a subcarrier spacing of the first time-frequency resource pool in frequency domain is configured by an RRC signaling.

In one embodiment, a value of a control resource set pool index corresponding to a Control resource set (CORESET) to which a PDCCH used to transmit the first signaling belongs is equal to 0.

In one embodiment, a value of a control resource set pool index corresponding to a CORESET to which a PDCCH used to transmit the first signaling belongs is equal to 1.

In one embodiment, the first value is equal to a maximum value in a first value set, the first value set comprises a first intermediate value, the first intermediate value is equal to K in the present application multiplied by a first parameter value, and the first parameter value is equal to 1 or 2.

In one embodiment, steps in the dotted-line box F1 exist.

In one embodiment, steps in the dotted-line box F1 do not exist.

Embodiment 6

Figure 6:
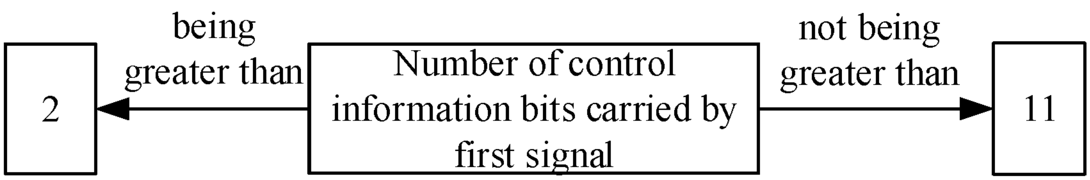
FIG. 6 illustrate a schematic diagram of a number of control information bit(s) carried by a first signal according to one embodiment of the present application.

Embodiment 6 illustrate a schematic diagram of a number of control information bit(s) carried by a first signal according to one embodiment of the present application, as shown in FIG. 6.

In embodiment 6, a number of control information bit(s) carried by the first signal is greater than 2 and not greater than 11.

Embodiment 7

Figure 7:
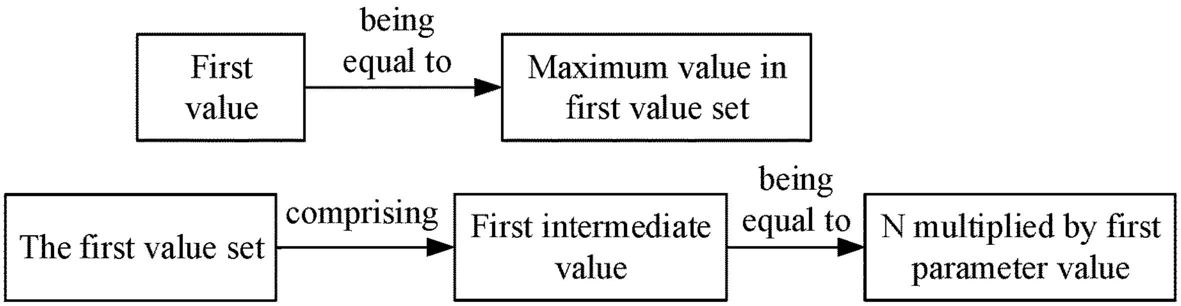
FIG. 7 illustrates a schematic diagram of relations among a first value, a first value set, a first intermediate value, N in the present application and a first parameter value according to one embodiment of the present application.

Embodiment 7 illustrates a schematic diagram of relations among a first value, a first value set, a first intermediate value, N in the present application and a first parameter value according to one embodiment of the present application, as shown in FIG. 7.

In embodiment 7, a first value is equal to a maximum value in a first value set, the first value set comprises a first intermediate value, the first intermediate value is equal to N multiplied by a first parameter value, and the first parameter value is equal to 1 or 2.

In one embodiment, the first node is configured or not configured with harq-ACK-SpatialBundlingPUCCH.

In one embodiment, a second parameter is used to determine a first parameter value, and the second parameter is configurable.

In one embodiment, the second parameter is a maxNrofCodeWordsScheduledByDCI parameter.

In one embodiment, the second parameter is a harq-ACK-SpatialBundlingPUCCH parameter.

In one embodiment, the second parameter is configured at the RRC layer.

In one embodiment, when a value of maxNrofCodeWordsScheduledByDCI for the serving cell c_i in the present application is 2 and harq-ACK-SpatialBundlingPUCCH is not configured, the first parameter value is equal to 2; otherwise, the first parameter value is equal to 1.

In one embodiment, when a value of maxNrofCodeWordsScheduledByDCI corresponding to at least one configured downlink BWP of the serving cell c_i in the present application is 2 and harq-ACK-SpatialBundlingPUCCH is not configured, the first parameter value is equal to 2; otherwise, the first parameter value is equal to 1.

In one embodiment, when a value of maxNrofCodeWordsScheduledByDCI corresponding to an activated downlink BWP of the serving cell c_i in the present application is 2 and harq-ACK-SpatialBundlingPUCCH is not configured, the first parameter value is equal to 2; otherwise, the first parameter value is equal to 1.

In one embodiment, the first value set comprises R value(s), and the R value(s) corresponds (respectively correspond) to R different serving cell(s), R being a positive integer.

In one embodiment, for any serving cell in the R different serving cell(s): the corresponding parameter value is related to at least one of a maxNrofCodeWordsScheduledByDCI parameter and a harq-ACK-SpatialBundlingPUCCH parameter.

In one embodiment, any value in the first value set is linearly correlated with a maximum number of PDSCH(s) that can be scheduled by DCI(s) for a serving cell.

In one embodiment, any value in the first value set is linearly correlated to a maximum number of PDSCH(s) that can be scheduled by one DCI on an activated downlink BWP in a serving cell.

In one embodiment, any value in the first value set is equal to a maximum number of PDSCH(s) that can be scheduled by one DCI(s) for a serving cell in the first time-domain resource pool in the present application multiplied by a parameter value corresponding to the serving cell, and the parameter value corresponding to the serving cell is equal to 1 or 2.

In one embodiment, any value in the first value set is equal to a maximum number of PDSCH(s) that can be scheduled by one DCI(s) for a serving cell multiplied by a parameter value corresponding to the serving cell, and the parameter value corresponding to the serving cell is equal to 1 or 2.

In one embodiment, any value in the first value set is equal to: a maximum number of PDSCH(s) that can be scheduled by one DCI on a serving cell multiplied by a parameter value corresponding to the serving cell, and the parameter value corresponding to the serving cell is equal to 1 or 2.

In one embodiment, any value in the first value set is equal to: a maximum number of PDSCH(s) that can be scheduled by one DCI on an activated downlink BWP of a serving cell multiplied by a parameter value corresponding to the serving cell, and the parameter value corresponding to the serving cell is equal to 1 or 2.

In one embodiment, when a value of maxNrofCodeWordsScheduledByDCI for any serving cell is 2 and harq-ACK-SpatialBundlingPUCCH is not configured, a parameter value corresponding to the any serving cell is equal to 2; otherwise, the first parameter value is equal to 1.

In one embodiment, the first value set only comprises the first intermediate value.

In one embodiment, the first value set comprises multiple values.

Embodiment 8

Figure 8:
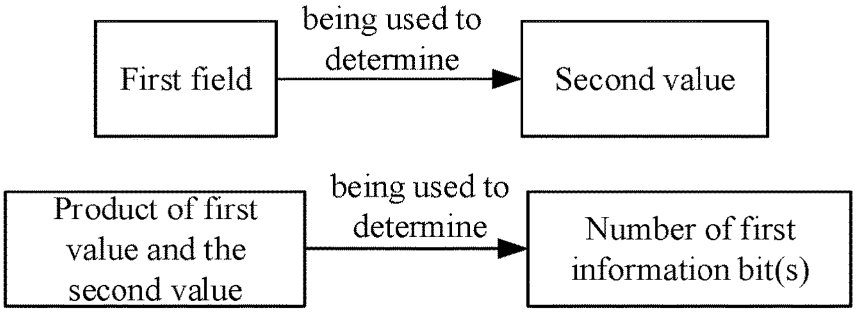
FIG. 8 illustrates a schematic diagram of relations among a first field, a second value, a first value as well as a first number of information bit(s) according to one embodiment of the present application.

Embodiment 8 illustrates a schematic diagram of relations among a first field, a second value, a first value as well as a first number of information bit(s) according to one embodiment of the present application, as shown in FIG. 8.

In embodiment 8, a first field is used to determine a second value, and a product of the first value and the second value is used to determine the first number of information bit(s).

In one embodiment, the first value is equal to a maximum value in a first value set, the first value set comprises a first intermediate value, the first intermediate value is equal to N multiplied by a first parameter value, and the first parameter value is equal to 1 or 2; the first field is used to determine a second value, and a product of the first value and the second value is used to determine the first number of information bit(s).

In one embodiment, the second value is equal to a difference value of a value of the first field minus a first number total number then modulo $T_D$, $T_D$ being a positive integer.

In one embodiment, the first number of information bit(s) is equal to a sum of multiple addends, and a product of the first value and the second value is one of the multiple addends.

In one embodiment, the $T_D$ is equal to V-th power of 2, and V is equal to a number of bit(s) comprised in a counter DAI field.

In one embodiment, $T_D$ is equal to V-th power of 2, and the V is equal to a number of bit(s) comprised in the first field.

In one embodiment, $T_D$ is equal to V-th power of 2, and the V is equal to a number of bit(s) comprised in a counter DAI field in the first signaling.

In one embodiment, the first sum is equal to one number, or a sum of multiple numbers; the number or one of the multiple numbers is equal to a total number of DCI(s) used to schedule a PDSCH reception, or indicate an SPS PDSCH release, or indicate an SCell dormancy for a serving cell detected in a first time-domain resource pool.

In one embodiment, the first sum is equal to one number, or a sum of multiple numbers; the number or one of the multiple numbers is equal to a total number of DCI(s) used to schedule multiple PDSCHs for a serving cell detected in a first time-domain resource pool.

In one embodiment, the first sum is equal to one number, or a sum of multiple numbers; the number or one of the multiple numbers is equal to a total number of DCI(s) used to schedule at least G PDSCHs for a serving cell detected in a first time-domain resource pool, G being a positive integer greater than 1.

In one subembodiment of the above embodiment, G is equal to 2.

In one subembodiment of the above embodiment, G is configurable.

In one subembodiment of the above embodiment, G is pre-defined.

In one embodiment, the first sum is equal to one number, or a sum of multiple numbers; the number or any of the multiple numbers is equal to a total number of DCI(s) used to schedule a PDSCH reception, or indicate an SPS PDSCH release, or indicate an SCell dormancy for a serving cell detected in a first time-domain resource pool.

In one embodiment, the first sum is equal to one number, or a sum of multiple numbers; the number or any of the multiple numbers is equal to a total number of DCI(s) used to schedule multiple PDSCHs for a serving cell detected in a first time-domain resource pool.

In one embodiment, the first sum is equal to one number, or a sum of multiple numbers; the number or any of the multiple numbers is equal to a total number of DCI(s) used to schedule at least G PDSCHs for a serving cell detected in a first time-domain resource pool, G being a positive integer greater than 1.

In one subembodiment of the above embodiment, G is equal to 2.

In one subembodiment of the above embodiment, G is configurable.

In one subembodiment of the above embodiment, G is pre-defined.

In one embodiment, the first sum is equal to a sum of B number(s), for any positive integer b not greater than B, a b-th number in the B-th number is equal to a total number of DCI(s) used to schedule a PDSCH reception, or indicate an SPS PDSCH release or indicate an SCell dormancy for serving cell c_b detected in a first time-domain resource pool.

In one subembodiment of the above embodiment, the c_b is a function of the b.

In one subembodiment of the above embodiment, the c_b is equal to the b.

In one subembodiment of the above embodiment, the c_b is equal to the b minus 1.

In one embodiment, the first sum is equal to a sum of B number(s); for any positive integer b not greater than B, a b-th number in the B-th number is equal to a total number of DCI(s) used to schedule multiple PDSCHs for serving cell c_b detected in a first time-domain resource pool.

In one subembodiment of the above embodiment, the c_b is a function of the b.

In one subembodiment of the above embodiment, the c_b is equal to the b.

In one subembodiment of the above embodiment, the c_b is equal to the b minus 1.

In one embodiment, the first sum is equal to a sum of B number(s); for any positive integer b not greater than B, a b-th number in the B-th number is equal to a total number of DCI(s) used to schedule at least G PDSCHs for serving cell c_b detected in a first time-domain resource pool, G being a positive integer greater than 1.

In one subembodiment of the above embodiment, the c_b is a function of the b.

In one subembodiment of the above embodiment, the c_b is equal to the b.

In one subembodiment of the above embodiment, the c_b is equal to the b minus 1.

In one subembodiment of the above embodiment, G is equal to 2.

In one subembodiment of the above embodiment, G is configurable.

In one subembodiment of the above embodiment, G is pre-defined.

In one embodiment, the c_b in the present application is a non-negative integer.

In one embodiment, when B in the present application is equal to 1, the B number in the present application is a number, and a sum of the B number in the present application is the number itself.

In one embodiment, the B in the present application is a positive integer.

In one embodiment, the B in the present application is equal to a number of serving cell(s) configured by a higher-layer signaling.

In one embodiment, the B in the present application is equal to a number of serving cell(s) supporting one DCI scheduling multiple PDSCHs configured by a higher-layer signaling.

In one embodiment, the B in the present application is equal to a number of serving cell(s) supporting one DCI scheduling at least G PDSCHs configured by a higher-layer signaling.

In one embodiment, the first number of information bit(s) is not less than a product of the first value and the second value.

In one embodiment, the first number of information bit(s) is equal to a product of the first value and the second value plus another value obtained by executing a calculation.

In one embodiment, the first number of information bit(s) is equal to a product of the first value and the second value plus a second sum, and the second sum is equal to $$\sum_{c\_b=0}^{B-1}\left(\sum_{m=0}^{M-1}N_{m,c\_b}^{received}+N_{SPS,c\_b}\right);\text{ the } N_{m,c\_b}^{received}\text{ is:}$$

a number of all TB(s) received in one or multiple PDSCHs scheduled by DCI(s) for serving cell c_b detected in an m-th PDCCH monitoring occasion in a first time-domain resource pool, or, a number of PDSCH(s) scheduled by DCI(s) for serving cell c_b detected in an m-th PDCCH monitoring occasion in a first time-domain resource pool, or, a number of DCI(s) used to indicate an SPS PDSCH release for serving cell c_b detected in an m-th PDCCH monitoring occasion in a first time-domain resource pool, or, a number of DCI(s) used to indicate an SCell dormancy for serving cell c_b detected in an m-th PDCCH monitoring occasion in a first time-domain resource pool; $N_{SPS,c\_b}$ is received on serving cell c_b, and a corresponding HARQ-ACK information bit is comprised in a number of SPS PDSCH(s) in a control information bit carried by the first signal.

In one embodiment, the first number of information bit(s) is equal to a product of the first value and the second value plus a second sum, and the second sum is equal to $$\sum_{c\_b=0}^{B-1}\sum_{m=0}^{M-1}N_{m,c\_b}^{received};\text{ the } N_{m,c\_b}^{received}\text{ is:}$$

a number of all TB(s) received in all PDSCH(s) scheduled by DCI(s) used to schedule multiple PDSCHs for serving cell c_b detected in an m-th PDCCH monitoring occasion in a first time-domain resource pool, or a number of PDSCH(s) scheduled by DCI(s) used to schedule multiple PDSCHs for serving cell c_b detected in an m-th PDCCH monitoring occasion in a first time-domain resource pool.

In one embodiment, the first number of information bit(s) is equal to a product of the first value and the second value plus a second sum, and the second sum is equal to $$\sum_{c\_b=0}^{B-1}\sum_{m=0}^{M-1}N_{m,c\_b}^{received};\text{ the } N_{m,c\_b}^{received}\text{ is:}$$

a number of all TB(s) received in all PDSCH(s) scheduled by DCI(s) used to schedule at least G PDSCHs for serving cell c_b detected in an m-th PDCCH monitoring occasion in a first time-domain resource pool, or a number of PDSCH(s) scheduled by DCI(s) used to schedule at least G PDSCHs for serving cell c_b detected in an m-th PDCCH monitoring occasion in a first time-domain resource pool.

In one embodiment, the first number of information bit(s) is equal to a product of the first value and the second value plus a second sum, and the second sum is equal to $$\sum_{c\_b=0}^{B-1}\left(\sum_{m=0}^{M-1}N_{m,c\_b}^{received}+N_{SPS,c\_b}\right);\text{ the } N_{m,c\_b}^{received}\text{ is:}$$

a number of all TB(s) received in all PDSCH(s) scheduled by DCI(s) used to schedule multiple PDSCHs for serving cell c_b detected in an m-th PDCCH monitoring occasion in a first time-domain resource pool, or a number of PDSCH(s) scheduled by DCI(s) used to schedule multiple PDSCHs for serving cell c_b detected in an m-th PDCCH monitoring occasion in a first time-domain resource pool; $N_{SPS,c\_b}$ is received on serving cell c_b, and a corresponding HARQ-ACK information bit is comprised in a number of SPS PDSCH(s) in a control information bit carried by the first signal.

In one embodiment, the first number of information bit(s) is equal to a product of the first value and the second value plus a second sum, and the second sum is equal to $$\sum_{c\_b=0}^{B-1}\left(\sum_{m=0}^{M-1}N_{m,c\_b}^{received}+N_{SPS,c\_b}\right);\text{ the } N_{m,c\_b}^{received}\text{ is:}$$

a number of all TB(s) received in all PDSCH(s) scheduled by DCI(s) used to schedule at least G PDSCHs for serving cell c_b detected in an m-th PDCCH monitoring occasion in a first time-domain resource pool, or a number of PDSCH(s) scheduled by DCI(s) used to schedule at least G PDSCHs for serving cell c_b detected in an m-th PDCCH monitoring occasion in a first time-domain resource pool; $N_{SPS,c\_b}$ is received on serving cell c_b, and a corresponding HARQ-ACK information bit is comprised in a number of SPS PDSCH(s) in a control information bit carried by the first signal.

Embodiment 9

Figure 9:
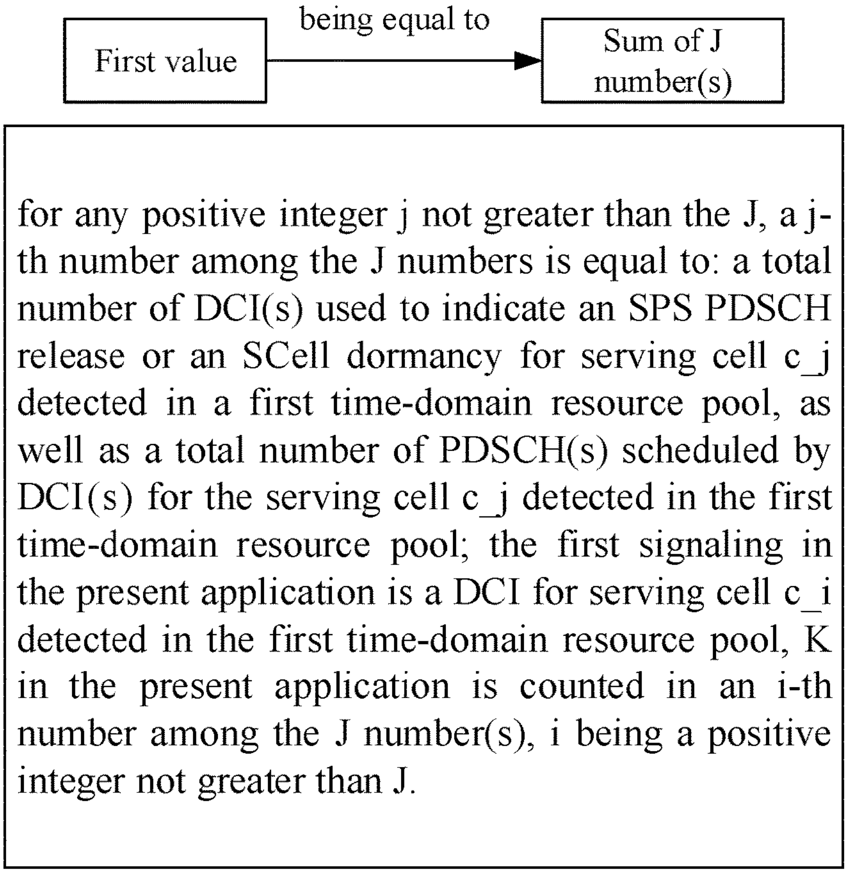
FIG. 9 illustrates a schematic diagram of a first value according to one embodiment of the present application.

Embodiment 9 illustrates a schematic diagram of a first value according to one embodiment of the present application, as shown in FIG. 9.

In embodiment 9, a first value is equal to a sum of J number(s); for any positive integer j not greater than the J, a j-th number among the J numbers is equal to: a total number of DCI(s) used to indicate an SPS PDSCH release or an SCell dormancy for serving cell c_j detected in a first time-domain resource pool, as well as a total number of PDSCH(s) scheduled by DCI(s) for the serving cell c_j detected in the first time-domain resource pool; the first signaling in the present application is a DCI for serving cell c_i detected in the first time-domain resource pool, K in the present application is counted in an i-th number among the J number(s), i being a positive integer not greater than J.

In one embodiment, the J in the present application is equal to a number of serving cell(s) configured by higher-layer signaling.

In one embodiment, J is a positive integer.

In one embodiment, for any positive integer j not greater than J, the c_j is a function of the j.

In one embodiment, for any positive integer j not greater than J, the c_j is equal to the j.

In one embodiment, for any positive integer j not greater than J, the c_j is equal to the j minus 1.

In one embodiment, the c_j is a non-negative integer.

In one embodiment, when J in the present application is equal to 1, J number in the present application is a number, and a sum of the J number in the present application is the number itself.

In one embodiment, in the present application, one or multiple PDSCHs scheduled by DCI(s) refers to: one or multiple PDSCHs scheduled by DCI(s) used to schedule a PDSCH reception.

In one embodiment, in the present application, a DCI used to activate an SPS does not belong a DCI used to schedule a PDSCH reception.

In one embodiment, the first node is configured with a counter DAI field, which respectively counts for each PDSCH.

In one embodiment, the first time-domain resource pool in the present application comprises at least one multicarrier symbol.

In one embodiment, the first time-domain resource pool in the present application comprises at least one PDCCH monitoring occasion.

In one embodiment, the first time-domain resource pool in the present application comprises M PDCCH monitoring occasion(s), M being a positive integer.

In one embodiment, the first time-domain resource pool in the present application is: M PDCCH monitoring occasion (s), M being a positive integer.

In one embodiment, the first time-domain resource pool in the present application is time-domain resources occupied by M PDCCH monitoring occasion(s), M being a positive integer.

In one embodiment, the first time-domain resource pool in the present application is continuous in time domain.

In one embodiment, the first time-domain resource pool in the present application is discontinuous in time domain.

Embodiment 10

Figure 10:
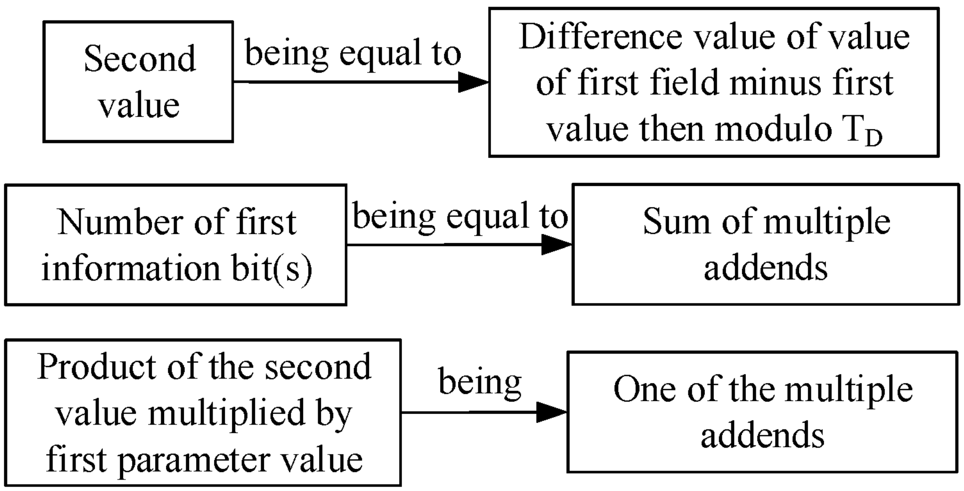
FIG. 10 illustrates a schematic diagram of a second value and a first number of information bit(s) according to one embodiment of the present application.

Embodiment 10 illustrates a schematic diagram of a second value and a first number of information bit(s) according to one embodiment of the present application, as shown in FIG. 10.

In embodiment 10, a second value is equal to a difference value of a value of a first field minus a first value then modulo $T_D$, $T_D$ being a positive integer, a first number of information bit(s) is equal to a sum of multiple addends, and a product of the second value multiplied by a first parameter value is one of the multiple addends.

In one subembodiment of embodiment 10, $T_D$ is configurable.

In one subembodiment of embodiment 10, $T_D$ is equal to V-th power of 2, and the V is equal to a number of bit(s) comprised in a counter DAI field in the first signaling.

In one subembodiment of embodiment 10, the first value is related to the first signaling.

In one subembodiment of embodiment 10, the first value is equal to a sum of a total number of first-type DCI(s) detected in a first time-domain resource pool and a total number of PDSCH(s) scheduled by second-type DCI(s) detected in the first time-domain resource pool; the first signaling in the present application is the second-type DCI, K in the present application is counted into the number of the PDSCH(s) scheduled by the second-type DCI; the first-type DCI is different from the second-type DCI.

In subembodiment in embodiment 10, the first value is equal to a sum of J number(s); for any positive integer j not greater than the J, a j-th number among the J numbers is equal to: a total number of DCI(s) used to indicate an SPS PDSCH release or an SCell dormancy for serving cell c_j detected in a first time-domain resource pool, as well as a total number of PDSCH(s) scheduled by DCI(s) for the serving cell c_j detected in the first time-domain resource pool; the first signaling in the present application is a DCI for serving cell c_i detected in the first time-domain resource pool, K in the present application is counted in an i-th number among the J number(s), i being a positive integer not greater than J.

In one subembodiment of embodiment 10, the first parameter value is a positive integer not greater than 64.

In one subembodiment of embodiment 10, the first parameter value is equal to 1 or 2.

In one subembodiment of embodiment 10, when a value of maxNrofCodeWordsScheduledByDCI for any serving cell is 2 and harq-ACK-SpatialBundlingPUCCH is not configured, the first parameter value is equal to 2; otherwise, the first parameter value is equal to 1.

In one subembodiment of embodiment 10, the first number of information bit(s) is equal to a sum of the second value multiplied by the first parameter value plus a second number; the second sum is equal to one number, or a sum of multiple numbers; when the second sum is equal to a sum of multiple numbers: the multiple numbers receptively correspond to multiple different serving cells.

In one subembodiment of embodiment 10, the first number of information bit(s) is equal to a sum of the second value multiplied by the first parameter value plus a second sum; the second sum is equal to $$\sum_{c\_j=0}^{J-1}\left(\sum_{m=0}^{M-1}N_{m,c\_j}^{received}+N_{SPS,c\_j}\right);\text{ the } N_{m,c\_j}^{received}\text{ is:}$$

a number of all TB(s) received in one or multiple PDSCHs scheduled by DCI(s) for serving cell c_j detected in an m-th PDCCH monitoring occasion in a first time-domain resource pool, or a number of PDSCH(s) scheduled by DCI(s) for serving cell c_j detected in an m-th PDCCH monitoring occasion in a first time-domain resource pool, or a number of DCI(s) used to indicate an SPS PDSCH release for serving cell c_j detected in an m-th PDCCH monitoring occasion in a first time-domain resource pool, or a number of DCI(s) used to indicate an SCell dormancy for serving cell c_j detected in an m-th PDCCH monitoring occasion in a first time-domain resource pool; $N_{SPS,c\_b}$ is received on serving cell c_j, and a corresponding HARQ-ACK information bit is comprised in a number of SPS PDSCH(s) in a control information bit carried by the first signal.

In one subembodiment of embodiment 10, the first number of information bit(s) is equal to the second value multiplied by the first parameter value then plus a second sum; the second sum is equal to $$\sum_{c\_j=0}^{J-1}\sum_{m=0}^{M-1}N_{m,c\_j}^{received};\text{ the } N_{m,c\_j}^{received}\text{ is:}$$

a number of all TB(s) received in one or multiple PDSCHs scheduled by DCI(s) for serving cell c_j detected in an m-th PDCCH monitoring occasion in a first time-domain resource pool, or a number of PDSCH(s) scheduled by DCI(s) for serving cell c_j detected in an m-th PDCCH monitoring occasion in a first time-domain resource pool, or a number of DCI(s) used to indicate an SPS PDSCH release for serving cell c_j detected in an m-th PDCCH monitoring occasion in a first time-domain resource pool, or a number of DCI(s) used to indicate an SCell dormancy for serving cell c_j detected in an m-th PDCCH monitoring occasion in a first time-domain resource pool.

In one embodiment, for any positive integer j not greater than J, the c_j is a function of j.

In one embodiment, for any positive integer j not greater than J, the c_j is equal to j.

In one embodiment, for any positive integer j not greater than J, the c_j is equal to j minus 1.

Embodiment 11

Figure 11:
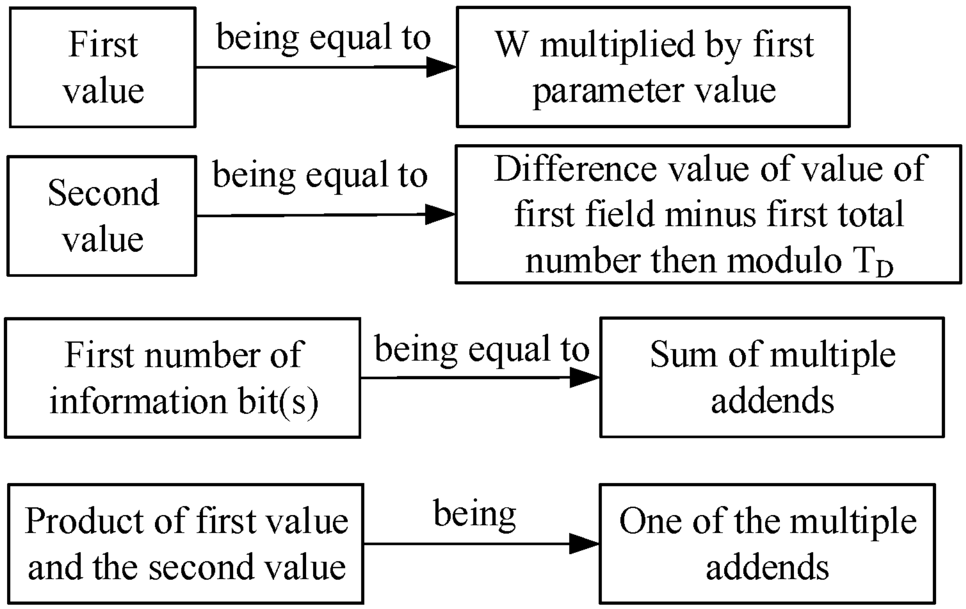
FIG. 11 illustrates a schematic diagram of a first value, a second value and a first number of information bit(s) according to one embodiment of the present application.

Embodiment 11 illustrates a schematic diagram of a first value, a second value and a first number of information bit(s) according to one embodiment of the present application, as shown in FIG. 11.

In embodiment 11, a first value is equal to W multiplied by a first parameter value, W is pre-defined or configurable, and the first parameter value is equal to 1 or 2; a second value is equal to a difference value of a value of a first field minus a first sum then modulo $T_D$, the $T_D$ is equal to V-th power of 2, V is equal to a number of bit(s) comprised in a counter DAI field in the first signaling, a first number of information bit(s) is equal to a sum of multiple addends, and a product of the first value and the second value is one of the multiple addends.

In one embodiment, when a value of maxNrofCodeWordsScheduledByDCI for any serving cell is 2 and harq-ACK-SpatialBundlingPUCCH is not configured, the first parameter value is equal to 2; otherwise, the first parameter value is equal to 1.

In one embodiment, the first signaling is used to execute a calculation to determine the first sum.

In one embodiment, the first signaling and W are used together to execute a calculation to determine the first sum.

In one embodiment, the first number of information bit(s) is equal to a product of the first value and the second value plus a second sum; the second sum is equal to $$\sum_{c\_j=0}^{J-1}\left(\sum_{m=0}^{M-1}N_{m,c\_j}^{received}+N_{SPS,c\_j}\right);\text{ the } N_{m,c\_j}^{received}\text{ is:}$$

a number of all TB(s) received in one or multiple PDSCHs scheduled by DCI(s) for serving cell c_j detected in an m-th PDCCH monitoring occasion in a first time-domain resource pool, or a number of PDSCH(s) scheduled by DCI(s) for serving cell c_j detected in an m-th PDCCH monitoring occasion in a first time-domain resource pool, or a number of DCI(s) used to indicate an SPS PDSCH release for serving cell c_j detected in an m-th PDCCH monitoring occasion in a first time-domain resource pool, or a number of DCI(s) used to indicate an SCell dormancy for serving cell c_j detected in an m-th PDCCH monitoring occasion in a first time-domain resource pool; $N_{SPS,c\_b}$ is received on serving cell c_j, and a corresponding HARQ-ACK information bit is comprised in a number of SPS PDSCH(s) in a control information bit carried by the first signal.

Embodiment 12

Figure 12:
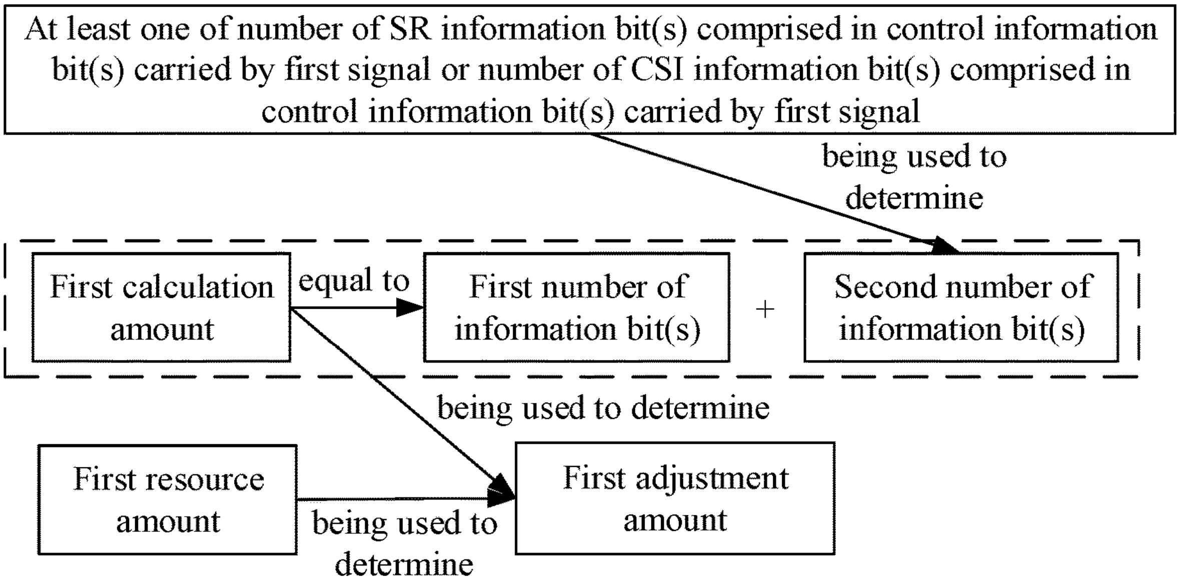
FIG. 12 illustrates a schematic diagram of a determination of a first calculation amount, as well as relations among a first calculation amount, a first resource amount and a first adjustment amount according to one embodiment of the present application.

Embodiment 12 illustrates a schematic diagram of a determination of a first calculation amount, as well as relations among a first calculation amount, a first resource amount and a first adjustment amount according to one embodiment of the present application, as shown in FIG. 12.

In embodiment 12, a first calculation amount is equal to a sum of the first number of information bit(s) plus a second number of information bit(s), and the first calculation amount and the first resource amount are used together to determine a first adjustment amount; at least one of a number of SR information bit(s) comprised in control information bit(s) carried by the first signal in the present application or a number of CSI information bit(s) comprised in control information bit(s) carried by the first signal in the present application is used to determine a number of second information bit(s).

In one embodiment, the meaning of the first calculation amount and the first resource amount being used together to determine the first adjustment amount comprises: a second calculation amount is equal to a product of $K_1$ and the first calculation amount divided by the first resource amount, and the first adjustment amount is equal to 10 times a logarithm of the second calculation amount based on 10, $K_1$ being predefined or configurable.

In one embodiment, the meaning of the first calculation amount and the first resource amount being used together to determine the first adjustment amount comprises: a second calculation amount is equal to a product of $K_1$ and the first calculation amount divided by the first resource amount, and the first adjustment amount$=10\times\log_{10}$ (the second calculation number), where $K_1$ is equal to 6.

In one embodiment, the first adjustment amount is linearly correlated with a product of the first calculation amount and the first resource amount.

In one embodiment, the second number of information bit(s) is equal 0.

In one embodiment, the second number of information bit(s) is equal to a number of SR information bit(s) comprised in control information bit(s) carried by the first signal.

In one embodiment, the second number of information bit(s) is equal to a sum of a number of SR information bit(s) comprised in control information bit(s) carried by the first signal and a number of CSI information bit(s) comprised in control information bit(s) carried by the first signal.

In one embodiment, a number of SR information bit(s) comprised in control information bit(s) carried by the first signal is equal to 0.

In one embodiment, a number of SR information bit(s) comprised in control information bit(s) carried by the first signal is greater than 0.

In one embodiment, a number of CSI information bit(s) comprised in control information bit(s) carried by the first signal is equal to 0.

In one embodiment, a number of CSI information bit(s) comprised in control information bit(s) carried by the first signal is greater than 0.

In one embodiment, the second number of information bit(s) is equal to a sum of multiple addends, a number of SR information bit(s) comprised in control information bit(s) carried by the first signal and a number of CSI information bit(s) comprised in control information bit(s) carried by the first signal are respectively two of the multiple addends.

In one embodiment, the second information bit number is equal to a sum of a number of SR information bit(s) comprised in control information bit(s) carried by the first signal, and a number of CSI information bit(s) comprised in control information bit(s) carried by the first signal and a third number of information bit(s).

In one embodiment, the second number of information bit(s) is equal to a sum of a number of SR information bit(s) comprised in control information bit(s) carried by the first signal and a third number of information bit(s).

In one embodiment, the third number of information bit(s) is related to a HARQ-ACK.

In one embodiment, the third number of information bit(s) is calculated by the first node executing a calculation.

In one embodiment, the third number of information bit(s) is equal to a product of one of 1 or 2 and the third value plus a fourth number; the third value is equal to a difference value of a value of a DCI field in a last DCI used to schedule only one PDSCH or indicate an SPS PDSCH release or indicate an SCell dormancy detected in a first time-domain resource pool minus a third sum then modulo $T_{D1}$, $T_{D1}$ is equal to V1-th power of 2, and the V1 is equal to a number of bit(s) comprised in a counter DAI field; the third sum is equal to one number, or a sum of multiple numbers; the number or any of the multiple numbers is equal to a total number of DCI(s) used to schedule only one PDSCH reception, or indicate an SPS PDSCH release, or indicate an SCell dormancy for a serving cell detected in a first time-domain resource pool; the fourth sum is equal to $\sum_{c\_b=0}^{B-1}\left(\sum_{m=0}^{M-1} N_{m,c\_b}^{received\text{-}singlePDSCH} + N_{SPS,c\_b}\right)$; the $N_{m,c\_b}^{received\text{-}singlePDSCH}$ is:

a number of all TB(s) received in a PDSCH scheduled by DCI(s) used to schedule only one PDSCH for serving cell c_b detected in an m-th PDCCH monitoring occasion in a first time-domain resource pool, or a number of PDSCH(s) scheduled by DCI(s) used to schedule only one PDSCH for serving cell c_b detected in an m-th PDCCH monitoring occasion in a first time-domain resource pool, or a number of DCI(s) used to indicate an SPS PDSCH release for serving cell c_b detected in an m-th PDCCH monitoring occasion in a first time-domain resource pool, or a number of DCI(s) used to indicate an SCell for serving cell c_b detected in an m-th PDCCH monitoring occasion in a first time-domain resource pool; $N_{SPS,c\_b}$ is received on serving cell c_b, and a corresponding HARQ-ACK information bit is comprised in a number of SPS PDSCH(s) in a control information bit carried by the first signal.

Embodiment 13

Embodiment 13 illustrates a schematic diagram of a target adjustment amount being used to determine first transmit power according to one embodiment of the present application, as shown in FIG. 13.

In embodiment 13, first transmit power is equal to a smaller value compared between upper limit transmit power and target transmit power, the target transmit power is equal to a sum of P power control components, and a target adjustment amount is one of the P power control components; the P is a positive integer greater than 1.

In one embodiment, the target transmit power is equal to a sum of a target adjustment amount and other power control components, and one of the other power control components is configurable or is related to the first time-frequency resource pool or is obtained based on an indication.

In one embodiment, the meaning of the expression in the present application that the target adjustment amount is used to determine the target transmit power comprises: the target transmit power is equal to a sum of multiple power control components, and a target adjustment amount is one of the multiple power control components.

In one embodiment, the meaning of the expression in the present application that the target adjustment amount is used to determine the target transmit power comprises: the target transmit power is equal to a sum of a target adjustment amount and other power control components, and one of the other power control components is configurable or is related to the first time-frequency resource pool or is obtained based on an indication.

In one embodiment, the upper transmit power is predefined.

In one embodiment, the upper transmit power is configurable.

In one embodiment, the upper transmit power is configured by an RRC signaling.

In one embodiment, the upper transmit power is configured maximum output power.

In one embodiment, the upper transmit power is for a PUCCH transmission occasion.

In one embodiment, the other power control components comprise at least one power control component.

In one embodiment, the other power control components comprise multiple power control components.

In one embodiment, one of the other power control components is defined in Chapter 7.2.1 of 3GPP TS38.213.

In one embodiment, the other power control components comprise at least one of a first power control component, a second power control component, a third power control component, a fourth power control component, and a fifth power control component.

In one embodiment, the target transmit power is equal to a sum of the target adjustment amount, a first power control component, a second power control component, a third power control component, a fourth power control component, and a fifth power control component.

In one embodiment, the first power control component is configured in a p0-nominal field.

In one embodiment, the first power control component is configured in a P0-PUCCH field.

In one embodiment, the first power control component is a p0-PUCCH-Value value.

In one embodiment, the first power control component is equal to 0.

In one embodiment, representation symbols of the first power control component comprise $P_{O\_PUCCH,\ b,\ f,\ c}$.

In one embodiment, representation symbols of the first power control component comprise O_PUCCH.

In one embodiment, the second power control component is equal to $10\times\log_{10}(2^\mu\times M_{RB})$, the $M_{RB}$ is equal to a number of RB(s) comprised by all or part of the first time-frequency RB in frequency domain, μ is configured by a Subcarrier spacing (SCS).

In one embodiment, the μ is configurable.

In one embodiment, the third power control component is a downlink pathloss estimate.

In one embodiment, the third power control component is measured by dB.

In one embodiment, the third power control component is obtained based on measurement and calculation for a reference signal.

In one embodiment, a representation symbol of the third power control component comprises $PL_{b,f,c}$.

In one embodiment, a representation symbol of the third power control component comprises PL.

In one embodiment, the fourth power control component is one of a value of deltaF-PUCCH-f2, a value of deltaF-PUCCH-f3, a value of deltaF-PUCCH-f4, or 0.

In one embodiment, the fourth power control component is related to a PUCCH format.

In one embodiment, the first time-frequency resource pool in the present application is time-frequency resources reserved for a first PUCCH, and the first PUCCH uses one of PUCCH format 2, PUCCH format 3, and PUCCH format 4; when the first PUCCH uses PUCCH format 2, the fourth power control component is a value of deltaF-PUCCH-f2 or 0; when the first PUCCH uses PUCCH format 2, the fourth power control component is a value of deltaF-PUCCH-f3 or 0; when the first PUCCH uses PUCCH format 2, the fourth power control component is a value of deltaF-PUCCH-f4 or 0.

In one embodiment, a representation symbol of the fourth power control component comprises $\Delta_{F\_PUCCH}$.

In one embodiment, a representation symbol of the fourth power control component comprises F_PUCCH.

In one embodiment, the fifth power control component is a PUCCH power control adjustment state.

In one embodiment, the fifth power control component is obtained based on an indication of a field in a DCI.

In one embodiment, the fifth power control component is determined based on a Transmit power control (TPC) command.

In one embodiment, a value of the fifth power control component is for a PUCCH transmission occasion corresponding to a first time-frequency resource pool in the present application.

In one embodiment, a representation symbol of the fifth power control component comprises $g_{b,f,c}$.

In one embodiment, a representation symbol of the target adjustment amount comprises Δ.

In one embodiment, a representation symbol of the target adjustment amount comprises $\Delta_{TF,b,f,c}$.

Embodiment 14

Embodiment 14 illustrates a schematic diagram of a first time-frequency resource pool according to one embodiment of the present application, as shown in FIG. 14.

In embodiment 14, a first time-frequency resource pool is reserved for time-frequency resources of a first PUCCH.

In one embodiment, the first PUCCH uses one of PUCCH format 2, PUCCH format 3, and PUCCH format 4.

In one embodiment, the first PUCCH also occupies a code-domain resource.

In one embodiment, the first signal in the present application is transmitted in the first PUCCH.

Embodiment 15

Embodiment 15 illustrates a schematic diagram of a relation between a first signaling and a first time-frequency resource pool according to one embodiment of the present application, as shown in FIG. 15.

In Embodiment 15, a first signaling is used to determine a first time-frequency resource pool.

In one subembodiment of embodiment 15, the first time-frequency resource pool is resources comprised in a first PUCCH resource in time-frequency domain, the first PUCCH resource belongs to a first PUCCH resource set, the first PUCCH resource set comprises at least one PUCCH resource, and the first signaling is used to determine the first PUCCH resource from the first PUCCH resource set; the first PUCCH resource set is one of X2 candidate PUCCH resource sets, X2 is a positive integer greater than 1, and the first information block in the present application is used to determine the X2 candidate PUCCH resource sets; a number of control information bit(s) carried by the first signal in the present application is used to determine the first PUCCH resource set from the X2 candidate PUCCH resource sets.

In one embodiment, the first information block in the present application indicates the X2 candidate PUCCH resource sets.

In one embodiment, a field comprised in the first information block in the present application is used to configure the X2 candidate PUCCH resource sets.

In one embodiment, X2 number ranges respectively correspond to X2 candidate PUCCH resource sets, a number of control information bit(s) carried by the first signal in the present application belongs to a first number range in the X2 number ranges, and the first PUCCH resource set is a PUCCH resource corresponding to the first number range among the X2 candidate PUCCH resource sets.

In one embodiment, the first signaling is used to indicate the first PUCCH resource from the first PUCCH resource set.

In one embodiment, the first signaling indicates an index of the first PUCCH resource in the first PUCCH resource set.

Embodiment 16

Embodiment 16 illustrates a structure block diagram of a processor in a first node, as shown in FIG. 16. In FIG. 16, the processor 1600 in the first node comprises a first receiver 1601 and a first transmitter 1602.

In one embodiment, the first node 1600 is a UE.

In one embodiment, the first node 1600 is a relay node.

In one embodiment, the first node 1600 is a vehicle-mounted communication device.

In one embodiment, the first node 1600 is a UE supporting V2X communications.

In one embodiment, the first node 1600 is a relay node supporting V2X communications.

In one embodiment, the first receiver 1601 comprises at least one of the antenna 452, the receiver 454, the multi-antenna receiving processor 458, the receiving processor 456, the controller/processor 459, the memory 460 or the data source 467 in FIG. 4 of the present application.

In one embodiment, the first receiver 1601 comprises at least the first five of the antenna 452, the receiver 454, the multi-antenna receiving processor 458, the receiving processor 456, the controller/processor 459, the memory 460 and the data source 467 in FIG. 4 of the present application.

In one embodiment, the first receiver 1601 comprises at least the first four of the antenna 452, the receiver 454, the multi-antenna receiving processor 458, the receiving processor 456, the controller/processor 459, the memory 460 and the data source 467 in FIG. 4 of the present application.

In one embodiment, the first receiver 1601 comprises at least the first three of the antenna 452, the receiver 454, the multi-antenna receiving processor 458, the receiving processor 456, the controller/processor 459, the memory 460 and the data source 467 in FIG. 4 of the present application.

In one embodiment, the first receiver 1601 comprises at least the first two of the antenna 452, the receiver 454, the multi-antenna receiving processor 458, the receiving processor 456, the controller/processor 459, the memory 460 and the data source 467 in FIG. 4 of the present application.

In one embodiment, the first transmitter 1602 comprises at least one of the antenna 452, the transmitter 454, the multi-antenna transmitting processor 457, the transmitting processor 468, the controller/processor 459, the memory 460, or the data source 467 in FIG. 4 of the present application.

In one embodiment, the first transmitter 1602 comprises at least first five of the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1602 comprises at least first four of the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1602 comprises at least first three of the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1602 comprises at least first two of the antenna 452, the transmitter 454, the multi-antenna transmitting processor 457, the transmitting processor 468, the controller/processor 459, the memory 460, and the data source 467 in FIG. 4 of the present application.

In embodiment 16, the first receiver 1601 receives a first information block and a first signaling, the first information block is used to determine a first time-frequency resource pool, the first signaling comprises a first field, the first signaling is used to schedule K PDSCHs, K being a positive integer greater than 1 and not greater than N, N being pre-defined or configurable; the first transmitter 1602 adopts first transmit power to transmit a first signal, the first signal carries at least one control information bit, control information bit(s) carried by the first signal comprises(comprise) HARQ-ACK information bit(s) for the K PDSCHs; herein, time-frequency resources occupied by the first signal belong to the first time-frequency resource pool; a first resource amount is a number of resource element(s) used for the first signal comprised in the first time-frequency resource pool; at least one of K or N is used to determine a first value, and the first field and the first value are used together to determine a first number of information bit(s); the first number of information bit(s) and the first resource amount are used together to determine the first transmit power.

In one embodiment, a number of control information bit(s) carried by the first signal is greater than 2 and not greater than 11.

In one embodiment, the first value is equal to a maximum value in a first value set, the first value set comprises a first intermediate value, the first intermediate value is equal to N multiplied by a first parameter value, and the first parameter value is equal to 1 or 2.

In one embodiment, the first field is used to determine a second value, and a product of the first value and the second value is used to determine the first number of information bit(s).

In one embodiment, the first value is equal to a sum of J numbers; for any positive integer j not greater than the J, a j-th number among the J numbers is equal to: a total number of DCI(s) used to indicate an SPS PDSCH release or an SCell dormancy for serving cell c_j detected in a first time-domain resource pool, as well as a total number of PDSCH(s) scheduled by DCI(s) for the serving cell c_j detected in the first time-domain resource pool; the first signaling is a DCI for serving cell c_i detected in the first time-domain resource pool, K is counted in an i-th number among the J number(s), i being a positive integer not greater than J.

In one embodiment, a second value is equal to a difference value of a value of the first field minus the first value then modulo $T_D$, $T_D$ being a positive integer, the first number of information bit(s) is equal to a sum of multiple addends, and a product of the second value multiplied by a first parameter value is one of the multiple addends.

In one embodiment, a first calculation amount is equal to a sum of the first number of information bit(s) plus a second number of information bit(s), and the first calculation amount and the first resource amount are used together to determine a first adjustment amount; at least one of a number of SR information bit(s) comprised in control information bit(s) carried by the first signal or a number of CSI information bit(s) comprised in control information bit(s) carried by the first signal is used to determine the second number of information bit(s).

In one embodiment, a target adjustment amount is equal to the first adjustment amount, the first transmit power is equal to a smaller one of upper transmit power and target transmit power, the target adjustment amount is used to determine the target transmit power, and the upper transmit power is pre-defined or configurable.

In one embodiment, the first value is equal to a maximum value in a first value set, the first value set comprises a first intermediate value, the first intermediate value is equal to N multiplied by a first parameter value, and the first parameter value is equal to 1 or 2; a second value is equal to a difference value of a value of the first field minus a first sum then modulo $T_D$, $T_D$ is equal to V-th power of 2, V is equal to a number of bit(s) comprised in a counter DAI field in the first signaling, and the first number of information bit(s) is equal to a product of the first value and the second value then plus a second sum.

In one subembodiment of the above embodiment, any value in the first value set is equal to: a maximum number of PDSCH(s) that can be scheduled by one DCI on a serving cell multiplied by a parameter value corresponding to the serving cell, and the parameter value corresponding to the serving cell is equal to 1 or 2.

In one subembodiment of the above embodiment, the first sum is equal to one number or a sum of multiple numbers; the number or any of the multiple numbers is equal to a total number of DCI(s) used to schedule a PDSCH reception, or indicate an SPS PDSCH release, or indicate an SCell dormancy for a serving cell detected in a first time-domain resource pool.

In one subembodiment of the above embodiment, the first sum is equal to one number, or a sum of multiple numbers; the number or any of the multiple numbers is equal to a total number of DCI(s) used to schedule at least G PDSCHs for a serving cell detected in a first time-domain resource pool, G being a positive integer greater than 1.

In one subembodiment of the above embodiment, the second sum is equal to $$\sum_{c\_b=0}^{B-1}\left(\sum_{m=0}^{M-1} N_{m,c\_b}^{received} + N_{SPS,c\_b}\right); \text{ the } N_{m,c\_b}^{received} \text{ is:}$$

a number of all TB(s) received in one or multiple PDSCHs scheduled by DCI(s) for serving cell c_b detected in an m-th PDCCH monitoring occasion in a first time-domain resource pool, or, a number of PDSCH(s) scheduled by DCI(s) for serving cell c_b detected in an m-th PDCCH monitoring occasion in a first time-domain resource pool, or, a number of DCI(s) used to indicate an SPS PDSCH release for serving cell c_b detected in an m-th PDCCH monitoring occasion in a first time-domain resource pool, or, a number of DCI(s) used to indicate an SCell dormancy for serving cell c_b detected in an m-th PDCCH monitoring occasion in a first time-domain resource pool; $N_{SPS,c\_b}$ is received on serving cell c_b, and a corresponding HARQ-ACK information bit is comprised in a number of SPS PDSCH(s) in control information bit(s) carried by the first signal.

In one subembodiment of the above embodiment, the second sum is equal to $$\sum_{c\_b=0}^{B-1}\sum_{m=0}^{M-1} N_{m,c\_b}^{received}; \text{ the } N_{m,c\_b}^{received} \text{ is:}$$

a number of all TB(s) received in all PDSCH(s) scheduled by DCI(s) used to schedule multiple PDSCHs for serving cell c_b detected in an m-th PDCCH monitoring occasion in a first time-domain resource pool, or a number of PDSCH(s) scheduled by DCI(s) used to schedule multiple PDSCHs for serving cell c_b detected in an m-th PDCCH monitoring occasion in a first time-domain resource pool.

In one embodiment, the first transmit power in the present application is determined by the first node in the present application.

Embodiment 17

Figure 17:
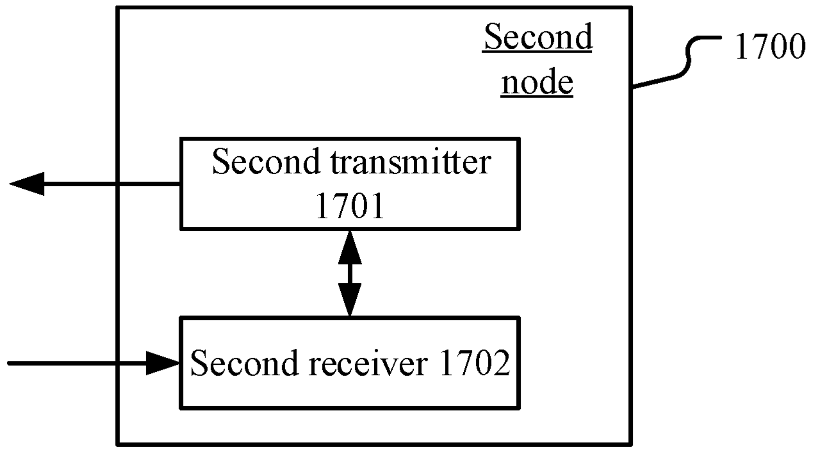
FIG. 17 illustrates a structure block diagram of a processor in a second node according to one embodiment of the present application.

Embodiment 17 illustrates a structure block diagram of a processor in a second node, as shown in FIG. 17. In FIG. 17, a processor 1700 in a second node comprises a second transmitter 1701 and a second receiver 1702.

In one embodiment, the second node 1700 is a UE.

In one embodiment, the second node 1700 is a base station.

In one embodiment, the second node 1700 is a relay node.

In one embodiment, the second node 1700 is a vehicle-mounted communication device.

In one embodiment, the second node 1700 is a UE supporting V2X communications.

In one embodiment, the second transmitter 1701 comprises at least one of the antenna 420, the transmitter 418, the multi-antenna transmitting processor 471, the transmitting processor 416, the controller/processor 475 or the memory 476 in FIG. 4 of the present application.

In one embodiment, the second transmitter 1701 comprises at least the first five of the antenna 420, the transmitter 418, the multi-antenna transmitting processor 471, the transmitting processor 416, the controller/processor 475 and the memory 476 in FIG. 4 of the present application.

In one embodiment, the second transmitter 1701 comprises at least the first four of the antenna 420, the transmitter 418, the multi-antenna transmitting processor 471, the transmitting processor 416, the controller/processor 475 and the memory 476 in FIG. 4 of the present application.

In one embodiment, the second transmitter 1701 comprises at least the first three of the antenna 420, the transmitter 418, the multi-antenna transmitting processor 471, the transmitting processor 416, the controller/processor 475 and the memory 476 in FIG. 4 of the present application.

In one embodiment, the second transmitter 1701 comprises at least the first two of the antenna 420, the transmitter 418, the multi-antenna transmitting processor 471, the transmitting processor 416, the controller/processor 475 and the memory 476 in FIG. 4 of the present application.

In one embodiment, the second receiver 1702 comprises at least one of the antenna 420, the receiver 418, the multi-antenna receiving processor 472, the receiving processor 470, the controller/processor 475 or the memory 476 in FIG. 4 of the present application.

In one embodiment, the second receiver 1702 comprises at least first five of the antenna 420, the receiver 418, the multi-antenna receiving processor 472, the receiving processor 470, the controller/processor 475 and the memory 476 in FIG. 4 of the present application.

In one embodiment, the second receiver 1702 comprises at least first four of the antenna 420, the receiver 418, the multi-antenna receiving processor 472, the receiving processor 470, the controller/processor 475 and the memory 476 in FIG. 4 of the present application.

In one embodiment, the second receiver 1702 comprises at least first three of the antenna 420, the receiver 418, the multi-antenna receiving processor 472, the receiving processor 470, the controller/processor 475 and the memory 476 in FIG. 4 of the present application.

In one embodiment, the second receiver 1702 comprises at least first two of the antenna 420, the receiver 418, the multi-antenna receiving processor 472, the receiving processor 470, the controller/processor 475 and the memory 476 in FIG. 4 of the present application.

In embodiment 17, the second transmitter 1701 transmits a first information block and a first signaling, the first information block is used to determine a first time-frequency resource pool, the first signaling comprises a first field, the first signaling is used to schedule K PDSCHs, K being a positive integer greater than 1 and not greater than N, N being pre-defined or configurable; the second receiver 1702 receives a first signal transmitted with first transmit power, the first signal carries at least one control information bit, control information bit(s) carried by the first signal comprises(comprise) HARQ-ACK information bit(s) for the K PDSCHs; herein, time-frequency resources occupied by the first signal belong to the first time-frequency resource pool; a first resource amount is a number of resource element(s) used for the first signal comprised in the first time-frequency resource pool; at least one of K or N is used to determine a first value, and the first field and the first value are used together to determine a first number of information bit(s); the first number of information bit(s) and the first resource amount are used together to determine the first transmit power.

In one embodiment, a number of control information bit(s) carried by the first signal is greater than 2 and not greater than 11.

In one embodiment, the first value is equal to a maximum value in a first value set, the first value set comprises a first intermediate value, the first intermediate value is equal to N multiplied by a first parameter value, and the first parameter value is equal to 1 or 2.

In one embodiment, the first field is used to determine a second value, and a product of the first value and the second value is used to determine the first number of information bit(s).

In one embodiment, the first value is equal to a sum of J numbers; for any positive integer j not greater than the J, a j-th number among the J numbers is equal to: a total number of DCI(s) used to indicate an SPS PDSCH release or an SCell dormancy for serving cell c_j detected in a first time-domain resource pool, as well as a total number of PDSCH(s) scheduled by DCI(s) for the serving cell c_j detected in the first time-domain resource pool; the first signaling is a DCI for serving cell c_i detected in the first time-domain resource pool, K is counted in an i-th number among the J number(s), i being a positive integer not greater than J.

In one embodiment, a second value is equal to a difference value of a value of the first field minus the first value then modulo $T_D$, $T_D$ being a positive integer, the first number of information bit(s) is equal to a sum of multiple addends, and a product of the second value multiplied by a first parameter value is one of the multiple addends.

In one embodiment, a first calculation amount is equal to a sum of the first number of information bit(s) plus a second number of information bit(s), and the first calculation amount and the first resource amount are used together to determine a first adjustment amount; at least one of a number of SR information bit(s) comprised in control information bit(s) carried by the first signal or a number of CSI information bit(s) comprised in control information bit(s) carried by the first signal is used to determine the second number of information bit(s).

In one embodiment, a target adjustment amount is equal to the first adjustment amount, the first transmit power is equal to a smaller one of upper transmit power and target transmit power, the target adjustment amount is used to determine the target transmit power, and the upper transmit power is pre-defined or configurable.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present application includes but is not limited to mobile phones, tablet computers, notebooks, network cards, low-consumption equipment, eMTC terminals, NB-IOT terminals, vehicle-mounted communication equipment, aircrafts, diminutive airplanes, unmanned aerial vehicles, telecontrolled aircrafts and other wireless communication devices. The UE or terminal in the present application includes but is not limited to mobile phones, tablet computers, notebooks, network cards, low-consumption equipment, eMTC terminals, NB-IOT terminals, vehicle-mounted communication equipment, aircrafts, diminutive airplanes, unmanned aerial vehicles, telecontrolled aircrafts, etc. The base station or network side equipment in the present application includes but is not limited to macro-cellular base stations, micro-cellular base stations, home base stations, relay base station, eNB, gNB, Transmitter Receiver Point (TRP), GNSS, relay satellites, satellite base stations, space base stations, test device, test equipment, test instrument and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE) configured for wireless communications, the UE comprising:

a receiver; and a transmitter, wherein:

the receiver is configured to receive a first information block, wherein the first information block indicates a first time-frequency resource pool;

the receiver is further configured to receive a first signaling information, wherein the first signaling information is a downlink control information (DCI), the first signaling information comprising a first field, wherein the first field is a downlink assignment index (DAI) field, the first signaling information being used to schedule a number, K, of physical downlink shared channels (PDSCHs), wherein K is not greater than N, wherein N is used to limit a maximum number of PDSCHs scheduled by one DCI; and the transmitter is configured to transmit a first signal using a first transmit power, wherein the first signal is a physical uplink control channel (PUCCH) transmission, the first signal comprising at least one control information bit, wherein the at least one control information bit comprises at least one hybrid automatic repeat request (HARQ)-acknowledgment (ACK) information bit for the K PDSCHs, wherein time-frequency resources occupied by the first signal belong to the first time-frequency resource pool, wherein a first resource amount is a number of resource elements used for the first signal comprised in the first time-frequency resource pool, wherein at least one of K or N is used to determine a first value, and the first field and the first value are used together to determine a first number of information bits, wherein the first number of information bits and the first resource amount are used together to determine the first transmit power, wherein the first value is equal to a maximum value in a first value set, the first value set comprises a first intermediate value, the first intermediate value is equal to N multiplied by a first parameter value, and the first parameter value is equal to one or two.

2. The UE of claim 1, wherein the first value set comprises multiple values, wherein any value in the first value set is equal to a maximum number of PDSCHs that can be scheduled by one DCI for a serving cell multiplied by a parameter value corresponding to the serving cell, and the parameter value corresponding to the serving cell is equal to one or two.

3. The UE of claim 1, wherein a number of control information bit(s) carried by bits in the first signal is greater than two and not greater than eleven.

4. The UE of claim 1, wherein a second value is equal to a difference value of a value of the first field minus a first sum then modulo $T_D$, $T_D$ is a positive integer, $T_D$ is equal to V-th power of 2, and V is equal to a number of bits comprised in a counter DAI field, wherein the first number of information bits is equal to a sum of multiple addends, and a product of the first value and the second value is one of the multiple addends, wherein the first sum is equal to one number, or a sum of multiple numbers, wherein the number or any of the multiple numbers is equal to a total number of DCIs used to schedule at least two PDSCHs for a serving cell detected in a first time-domain resource pool, and the first time-domain resource pool comprises at least one physical downlink control channel (PDCCH) monitoring occasion.

5. The UE of claim 4, wherein a first calculation amount is equal to a sum of the first number of information bits plus a second number of information bits, and the first calculation amount and the first resource amount are used together to determine a first adjustment amount, wherein at least one of a number of scheduling request (SR) information bits comprised in control information bits in the first signal or a number of channel state information (CSI) information bits comprised in control information bits in the first signal is used to determine the second number of information bits, wherein a target adjustment amount is equal to the first adjustment amount, the first transmit power is equal to a smaller one of upper transmit power and target transmit power, the target adjustment amount is used to determine the target transmit power, and the upper transmit power is pre-defined or configurable, wherein a second calculation amount is equal to a product of $K_1$ and the first calculation amount divided by the first resource amount, and the first adjustment amount=$10\times\log_{10}$ (the second calculation amount), $K_1$ is equal to six.

6. The UE of claim 4, wherein a first calculation amount is equal to the first number of information bits, wherein the first calculation amount and the first resource amount are used together to determine a first adjustment amount, wherein a target adjustment amount is equal to the first adjustment amount, the first transmit power is equal to a smaller one of upper transmit power and target transmit power, the target adjustment amount is used to determine the target transmit power, and the upper transmit power is pre-defined or configurable.

7. A base station configured for wireless communications, the base station comprising:

a receiver; and a transmitter, wherein:

the transmitter is configured to transmit a first information block, wherein the first information block indicates a first time-frequency resource pool;

the transmitter is configured to transmit a first signaling information, wherein the first signaling information is a downlink control information (DCI), the first signaling information comprising a first field, wherein the first field is a downlink assignment index (DAI) field, the first signaling information being used to schedule a number, K, of physical downlink shared channels (PDSCHs), wherein K is not greater than N, wherein N is used to limit a maximum number of PDSCHs scheduled by one DCI; and the receiver is configured to receive a first signal transmitted with a first transmit power, wherein the first signal is a physical uplink control channel (PUCCH) transmission, the first signal comprising at least one control information bit, wherein the at least one control information bit comprises at least one hybrid automatic repeat request (HARQ)-acknowledgement (ACK) information bit for the K PDSCHs, wherein time-frequency resources occupied by the first signal belong to the first time-frequency resource pool, wherein a first resource amount is a number of resource elements used for the first signal comprised in the first time-frequency resource pool, wherein at least one of K or N is used to determine a first value, and the first field and the first value are used together to determine a first number of information bits, wherein the first number of information bits and the first resource amount are used together to determine the first transmit power, wherein the first value is equal to a maximum value in a first value set, the first value set comprises a first intermediate value, the first intermediate value is equal to N multiplied by a first parameter value, and the first parameter value is equal to one or two.

8. The base station of claim 7, wherein a second value is equal to a difference value of a value of the first field minus a first sum then modulo $T_D$, $T_D$ is a positive integer, $T_D$ is equal to V-th power of 2, and V is equal to a number of bits comprised in a counter DAI field, wherein the first number of information bits is equal to a sum of multiple addends, and a product of the first value and the second value is one of the multiple addends, wherein the first sum is equal to one number, or a sum of multiple numbers, wherein the number or any of the multiple numbers is equal to a total number of DCIs used to schedule at least two PDSCHs for a serving cell detected in a first time-domain resource pool, and the first time-domain resource pool comprises at least one physical downlink control channel (PDCCH) monitoring occasion.

9. A method for use in a user equipment (UE) configured for wireless communications, the method comprising:

receiving a first information block, wherein the first information block indicates a first time-frequency resource pool;

receiving a first signaling information, wherein the first signaling information is a downlink control information (DCI,) the first signaling information comprising a first field, wherein the first field is a downlink assignment index (DAI) field, the first signaling information being used to schedule a number, K, of physical downlink shared channels (PDSCHs), wherein K is not greater than N, wherein N is used to limit a maximum number of PDSCHs scheduled by one DCI; and transmitting a first signal using a first transmit power, wherein the first signal is a physical uplink control channel (PUCCH) transmission, the first signal comprising at least one control information bit, wherein the at least one control information bit comprises at least one hybrid automatic repeat request (HARQ)-acknowledgement (ACK) information bit for the K PDSCHs, wherein time-frequency resources occupied by the first signal belong to the first time-frequency resource pool, wherein a first resource amount is a number of resource elements used for the first signal comprised in the first time-frequency resource pool, wherein at least one of K or N is used to determine a first value, and the first field and the first value are used together to determine a first number of information bits wherein the first number of information bits and the first resource amount are used together to determine the first transmit power, wherein the first value is equal to a maximum value in a first value set, the first value set comprises a first intermediate value, the first intermediate value is equal to N multiplied by a first parameter value, and the first parameter value is equal to one or two.

10. The method of claim 9, wherein the first value set comprises multiple values, wherein any value in the first value set is equal to a maximum number of PDSCHs that can be scheduled by one DCI for a serving cell multiplied by a parameter value corresponding to the serving cell, and the parameter value corresponding to the serving cell is equal to one or two.

11. The method of claim 9, wherein a number of control information bits in the first signal is greater than two and not greater than eleven.

12. The method of claim 9, wherein a second value is equal to a difference value of a value of the first field minus a first sum then modulo $T_D$, $T_D$ is a positive integer, $T_D$ is equal to V-th power of 2, and Vis equal to a number of bits comprised in a counter DAI field, wherein the first number of information bits is equal to a sum of multiple addends, and a product of the first value and the second value is one of the multiple addends, wherein the first sum is equal to one number, or a sum of multiple numbers, wherein the number or any of the multiple numbers is equal to a total number of DCIs used to schedule at least two PDSCHs for a serving cell detected in a first time-domain resource pool, and the first time-domain resource pool comprises at least one physical downlink control channel (PDCCH) monitoring occasion.

13. The method of claim 12, wherein a first calculation amount is equal to a sum of the first number of information bits plus a second number of information bits, and the first calculation amount and the first resource amount are used together to determine a first adjustment amount, wherein at least one of a number of scheduling request (SR) information bits comprised in control information bits in the first signal or a number of channel state information (CSI) information bits comprised in control information bits in the first signal is used to determine the second number of information bits, wherein a target adjustment amount is equal to the first adjustment amount, the first transmit power is equal to a smaller one of upper transmit power and target transmit power, the target adjustment amount is used to determine the target transmit power, and the upper transmit power is pre-defined or configurable, wherein a second calculation amount is equal to a product of $K_1$ and the first calculation amount divided by the first resource amount, and the first adjustment amount=$10\times\log_{10}$ (the second calculation amount), $K_1$ is equal to six.

14. The method of claim 12, wherein a first calculation amount is equal to the first number of information bits, wherein the first calculation amount and the first resource amount are used together to determine a first adjustment amount, wherein a target adjustment amount is equal to the first adjustment amount, the first transmit power is equal to a smaller one of upper transmit power and target transmit power, the target adjustment amount is used to determine the target transmit power, and the upper transmit power is pre-defined or configurable.

15. A method for use in a base station configured for wireless communications, the method comprising:

transmitting a first information block, wherein the first information block indicates a first time-frequency resource pool;

receiving a first signaling information, wherein the first signaling information is a downlink control information (DCI), the first signaling information comprising a first field, wherein the first field is a downlink assignment index (DAI) field, the first signaling information being used to schedule a number, K, of physical downlink shared channels (PDSCHs), wherein K is not greater than N, wherein N is used to limit a maximum number of PDSCHs scheduled by one DCI; and receiving a first signal transmitted with a first transmit power, wherein the first signal is a physical uplink control channel (PUCCH) transmission, the first signal comprising at least one control information bit, wherein the at least one control information bit comprises hybrid automatic repeat request (HARQ)-acknowledgement (ACK) information bits for the K PDSCHs, wherein time-frequency resources occupied by the first signal belong to the first time-frequency resource pool, wherein a first resource amount is a number of resource elements used for the first signal comprised in the first time-frequency resource pool, wherein at least one of K or N is used to determine a first value, and the first field and the first value are used together to determine a first number of information bits, wherein the first number of information bits and the first resource amount are used together to determine the first transmit power, wherein the first value is equal to a maximum value in a first value set, the first value set comprises a first intermediate value, the first intermediate value is equal to N multiplied by a first parameter value, and the first parameter value is equal to one or two.

* * * * *